(12) United States Patent
Joo et al.

(10) Patent No.: US 11,288,029 B2
(45) Date of Patent: Mar. 29, 2022

(54) DISPLAY APPARATUS AND METHOD OF CONTROLLING THE SAME

(71) Applicant: SAMSUNG ELECTRONICS CO., LTD., Suwon-si (KR)

(72) Inventors: Sungyong Joo, Suwon-si (KR); Jeongil Kang, Suwon-si (KR); Sunjin Park, Suwon-si (KR); Sungbum Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/077,120

(22) Filed: Oct. 22, 2020

(65) Prior Publication Data

US 2021/0124543 A1 Apr. 29, 2021

(30) Foreign Application Priority Data

Oct. 29, 2019 (KR) .......................... 10-2019-0135273

(51) Int. Cl.
  *G06F 3/14* (2006.01)
  *G06F 1/16* (2006.01)
  *G06F 1/3234* (2019.01)

(52) U.S. Cl.
  CPC .......... *G06F 3/1446* (2013.01); *G06F 1/1641* (2013.01); *G06F 1/1681* (2013.01); *G06F 1/3265* (2013.01)

(58) Field of Classification Search
  CPC .. G09F 9/301; G09F 9/3026; G09F 2007/186; G06F 1/1681; G06F 3/1446; G06F 1/3265; G06F 1/1641
  See application file for complete search history.

(56) References Cited

U.S. PATENT DOCUMENTS

| | | | |
|---|---|---|---|
| 10,180,704 | B1 | 1/2019 | Stewart et al. |
| 2012/0002357 | A1 | 1/2012 | Auld et al. |

(Continued)

FOREIGN PATENT DOCUMENTS

| | | |
|---|---|---|
| EP | 1 548 573 | 12/2003 |
| EP | 3 035 320 | 12/2015 |

(Continued)

OTHER PUBLICATIONS

International Search Report and Written Opinion dated Feb. 15, 2021 in counterpart International Patent Application No. PCT/KR2020/014586.

(Continued)

*Primary Examiner* — Abbas I Abdulselam
(74) *Attorney, Agent, or Firm* — Nixon & Vanderhye P.C.

(57) ABSTRACT

Disclosed are a display apparatus and a method of controlling the same, the display apparatus including: a plurality of display modules arranged in up and down directions, and configured to switch between a first state, the first state being a folded state and a second state, the second state being an unfolded state; a plurality of joining units each comprising a hinge provided between the plurality of display modules and configured to join adjacent display modules; a driver including a wire supporting the plurality of display modules, and configured to drive the plurality of display modules to switch to the first state or the second state by adjusting a length of the wire; and a pair of coupling guides provided on lateral sides of the plurality of display modules and configured to guide adjacent display modules to switch between the first state and the second state.

20 Claims, 19 Drawing Sheets

(56) References Cited

U.S. PATENT DOCUMENTS

| | | |
|---|---|---|
| 2013/0187833 A1 | 7/2013 | Kim |
| 2014/0232617 A1 | 8/2014 | Anite |
| 2014/0340832 A1* | 11/2014 | Kwon ................. H04M 1/0216 |
| | | 361/679.27 |
| 2015/0117009 A1 | 4/2015 | Liu |
| 2016/0179133 A1* | 6/2016 | Hochman ............. G09F 9/3026 |
| | | 345/1.3 |
| 2017/0181304 A1* | 6/2017 | Lee ........................ H05K 7/005 |
| 2018/0039410 A1* | 2/2018 | Kim ....................... G06F 1/1677 |
| 2019/0011955 A1 | 1/2019 | Stewart et al. |
| 2019/0051705 A1 | 2/2019 | Breedlove et al. |
| 2019/0058136 A1 | 2/2019 | Macinnis et al. |
| 2019/0073002 A1 | 3/2019 | Wu et al. |
| 2019/0074469 A1 | 3/2019 | Kwon et al. |
| 2019/0086961 A1 | 3/2019 | Hsu |
| 2019/0095072 A1 | 3/2019 | Du |
| 2019/0104626 A1 | 4/2019 | Jeon |
| 2019/0109286 A1 | 4/2019 | Ma et al. |

FOREIGN PATENT DOCUMENTS

| | | |
|---|---|---|
| EP | 3 244 387 | 9/2016 |
| JP | H05-061423 | 3/1993 |
| JP | 2013-228975 | 11/2013 |
| KR | 10-2013-0117429 | 10/2013 |
| WO | 2012/005541 | 1/2012 |
| WO | 2014/200554 | 12/2014 |

OTHER PUBLICATIONS

Extended Search Report and Written Opinion dated Apr. 22, 2021 in counterpart European Patent Application No. 20204375.8.

* cited by examiner

FIG. 2
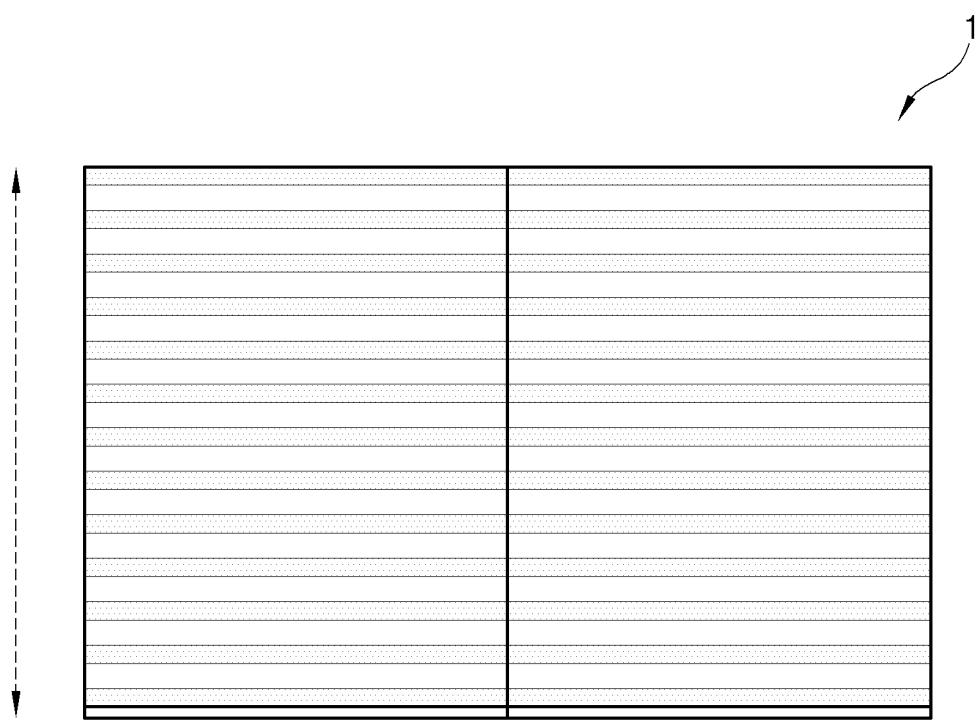
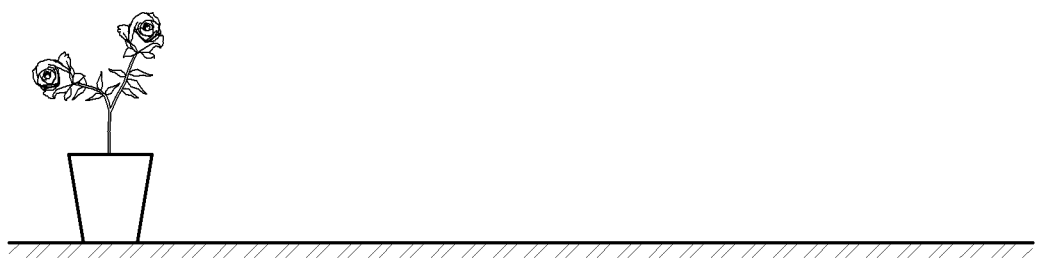

FIG. 3
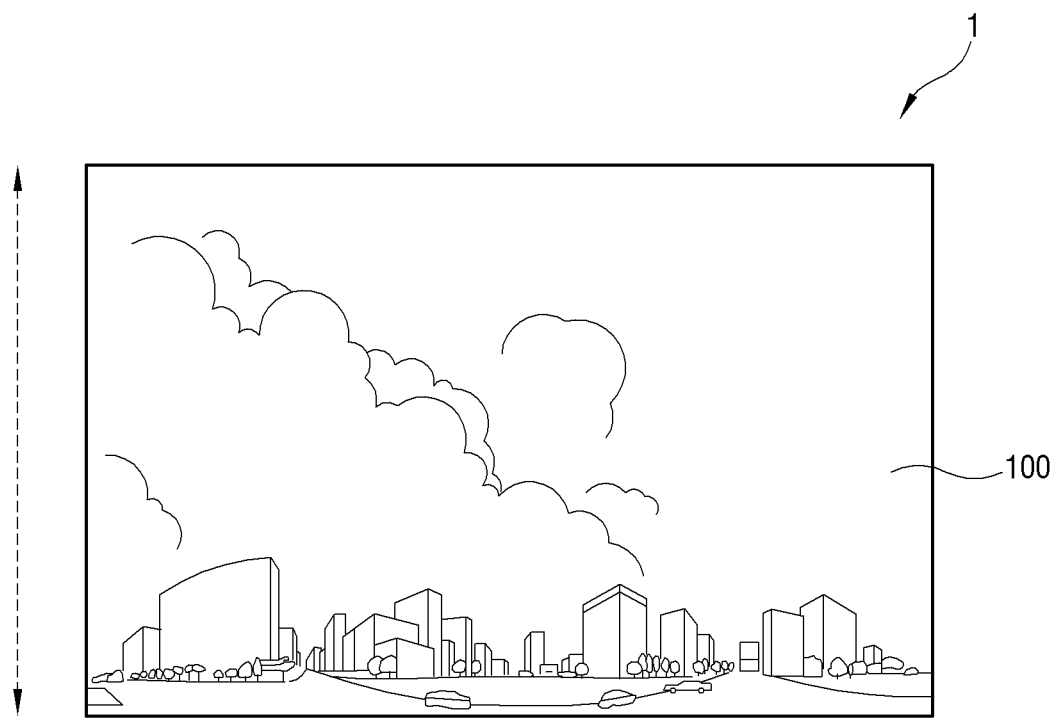
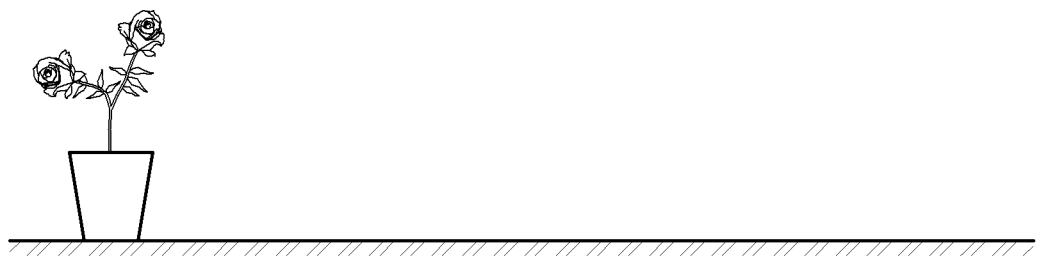

DISPLAY APPARATUS AND METHOD OF CONTROLLING THE SAME

CROSS-REFERENCE TO RELATED APPLICATION

This application is based on and claims priority under 35 U.S.C. § 119 to Korean Patent Application No. 10-2019-0135273 filed on Oct. 29, 2019 in the Korean Intellectual Property Office, the disclosure of which is incorporated by reference herein in its entirety.

BACKGROUND

Field

The disclosure relates to a display apparatus, including a foldable display, and a method of controlling the same.

Description of Related Art

A display apparatus for displaying content, which is received from an external image source or stored in the apparatus, to a user has been used in various fields such as households, business places, etc.

A modular-type display apparatus may refer, for example, to a display apparatus embodied in such a manner that display modules having a certain size are tiled to form a screen.

The modular-type display apparatus is suitable to form a large screen because the size and shape of the screen can be made as desired and various combinations for a whole-wall screen, etc. are possible.

The display apparatus that forms the large screen has been more and more widely applied even to a household as well as a theater or a public place, and thus required to be lightweight and convenient in installation and use, etc. when installed at home or indoors.

SUMMARY

Embodiments of the disclosure provide a display apparatus for a foldable display with a plurality of display modules arranged up and down to harmonize with surroundings when folded and achieve a screen when unfolded, and a method of controlling the same.

Embodiments of the disclosure provide a display apparatus, in which display modules are unfolded with ease of coupling and keeping the coupled state by an attractive force of magnets, and the unfolded display modules are folded with ease by a repulsive force of the magnets, and a method of controlling the same.

According to an example embodiment, a display apparatus is provided, the display apparatus including: a plurality of display modules, each including a display, arranged in up and down directions, and configured to switch between a first state, the first state being a folded state and a second state, the second state being an unfolded state; a plurality of joining units, each comprising a hinge, provided between the plurality of display modules and configured to join adjacent display modules; a driver including a wire supporting the plurality of display modules, and configured to drive the plurality of display modules to switch to the first state or the second state based on adjusting a length of the wire; and a pair of coupling guides including magnets provided on lateral sides of the plurality of display modules configured to guide the adjacent display modules to switch between the first state and the second state.

The joining unit may include a hinge allowing the pair of adjacent display modules to swing to each other.

The magnet of at least one of the pair of coupling guides may include an electromagnet, and the display apparatus may further include a controller configured to control the electromagnet to be driven so that the pair of coupling guides can be attached to each other when switching from the first state to the second state.

The controller may be configured to control the electromagnets to be driven so that a plurality of the pairs of coupling guides can be attached in sequence from a top toward a bottom when switching from the first state to the second state.

The controller may be configured to control the electromagnet to be driven so that the pair of coupling guides can be detached when switching from the second state to the first state.

To control some among the plurality of display modules to be in the first state and remaining modules to be in the second state, the controller may be configured to control the electromagnets to be driven so that a plurality of the pairs of corresponding coupling guides can be selectively attached or detached.

The controller may be configured to control the plurality of display modules so that the display modules in the first state cannot display an image and the display modules in the second state can display an image.

The controller may be configured to control an image to be displayed to be adjusted in at least one of a size or a position based on a usable screen region formed by the display modules in the second state.

The display apparatus may further include a power supply, and the controller may be configured to control the power supply to supply no power to the display module in the first state, and supply power to the display module in the second state.

The display apparatus may further include a sensor configured to identify whether each of the plurality of display modules is in the first state or the second state, and the controller may be configured to control the power supply to supply power to the identified display module in the second state among the plurality of display modules, based on an identification by the sensor.

The pair of coupling guides may further respectively include a protruding portion, and a recessed portion to accommodate the protruding portion in the second state.

The recessed portion may be shaped corresponding to the protruding portion and prevent and/or reduce the accommodated protruding portion from moving in the second state.

The display apparatus may further include a pair of first connectors respectively provided on opposite lateral sides of adjacent display modules forming a pair, respectively provided with first signal lines configured to provide power or an image signal, and configured to connect the first signal lines each other in the second state and to disconnect the first signal lines in the first state.

The display apparatus may further include a pair of second connectors provided opposite the pair of first connectors with the pair of coupling guides therebetween, respectively provided with second signal lines connected to the first signal line, and configured to connect the second signal lines each other in the second state and to disconnect the second signal lines in the first state.

The pair of first connectors or the pair of second connectors may be attached to each other based on attachment between the pair of coupling guides, so that the first signal lines or the second signal lines can be connected to each other.

According to an example embodiment, a method of controlling a display apparatus is provided, the method including: in a display apparatus including a plurality of display modules arranged in up and down directions, and configured to switch between a first state the first state being a folded state or a second state, the second state being an unfolded state, identifying that the display module switches from the first state to the second state; and with a pair of coupling guides including an electromagnet in at least one of opposite lateral sides of a pair of adjacent display modules among the plurality of display modules, controlling the pair of adjacent display modules in the second state to be coupled by driving the electromagnet so that the pair of coupling guides can be attached to couple the adjacent display modules when switching to the second state.

The method may further include: identifying whether each of the plurality of display modules is in the first state or the second state; and controlling a power supply so that no power is supplied to the display module in the first state among the plurality of display modules, and to supply power to the display module in the second state, based on an identification.

The method may further include controlling the display module in the first state among the plurality of display modules to not display an image, and the display module in the second state to display an image.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2 is a diagram illustrating an example installed display apparatus according various embodiments;

FIG. 3 is a diagram illustrating an example installed display apparatus according to various embodiments;

DETAILED DESCRIPTION

Figure 1:
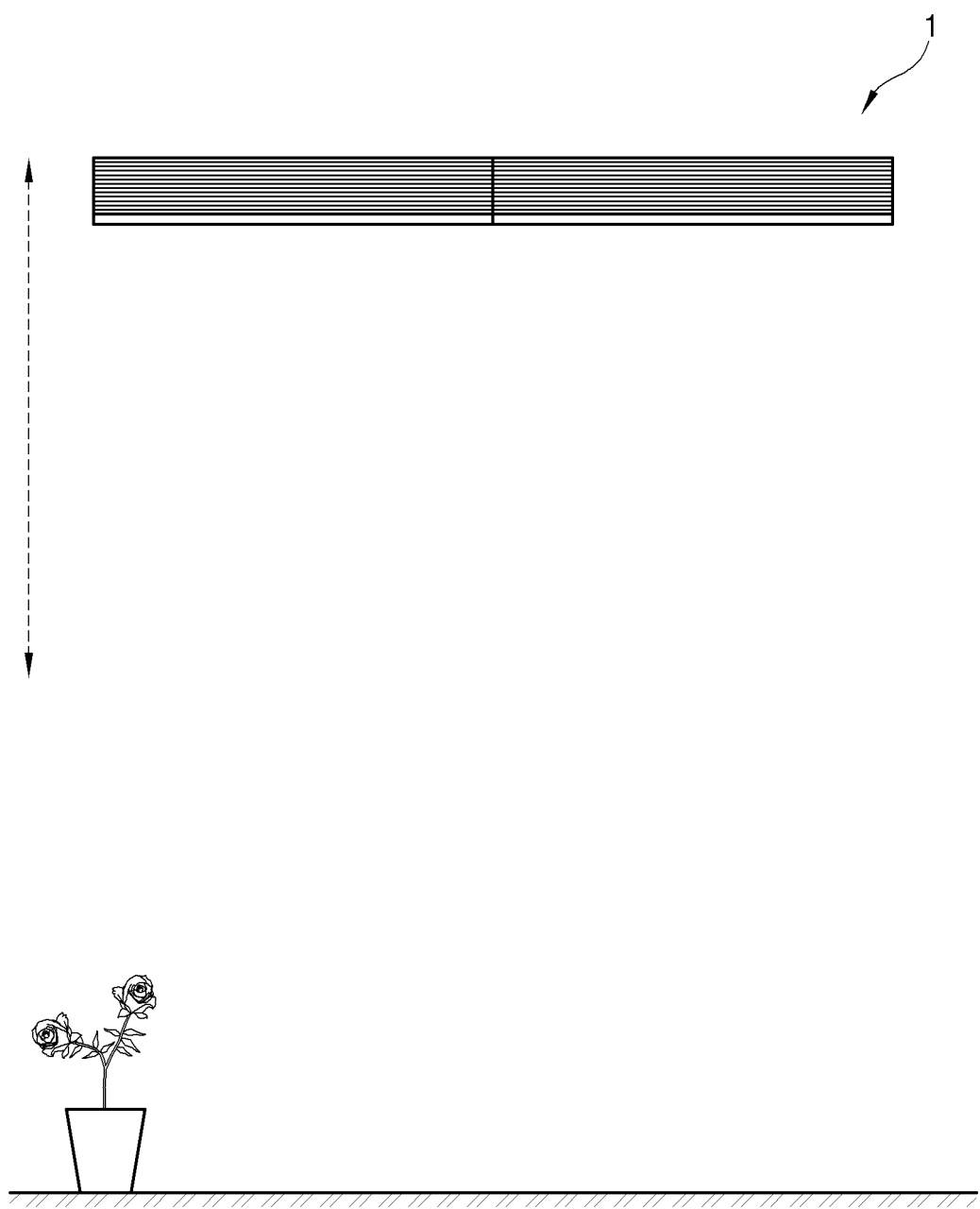
FIG. 1 is a diagram illustrating an example installed display apparatus according to various embodiments.

Below, various example embodiments will be described in greater detail with reference to the accompanying drawings. In the drawings, like numerals or symbols refer to like elements having substantially the same function, and the size of each element may be exaggerated for clarity and convenience of description. However, the configurations and functions illustrated in the following example embodiments are not to be understood as limiting the present disclosure and the key configurations and functions. In the following descriptions, details about publicly known functions or features may be omitted if it is determined that they cloud the gist of the present disclosure.

In the following example embodiments, terms 'first', 'second', etc. are simply used to distinguish one element from another, and singular forms are intended to include plural forms unless otherwise mentioned contextually. In the following example embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

Figure 4:
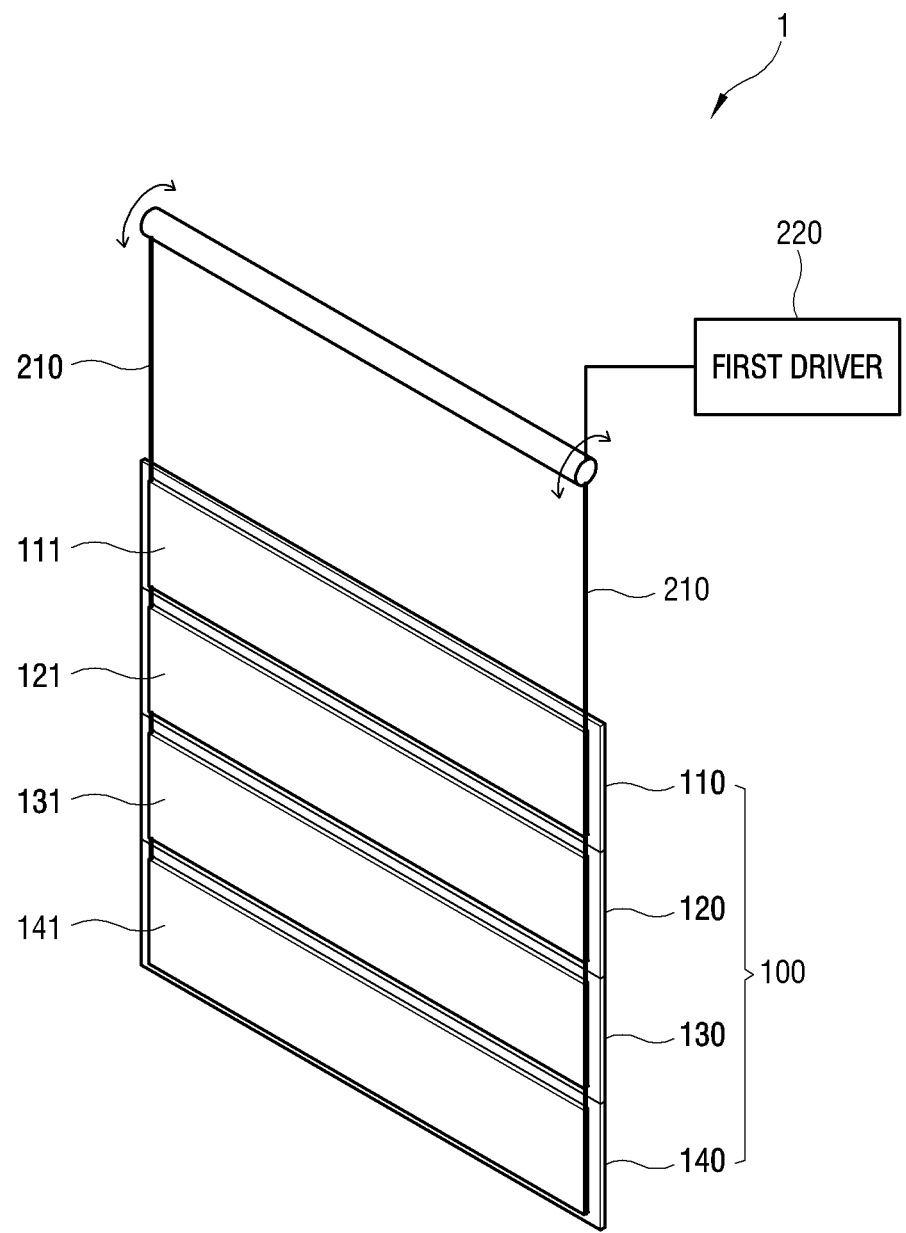
FIG. 4 is a perspective view illustrating an example display apparatus according various embodiments.
Figure 5:
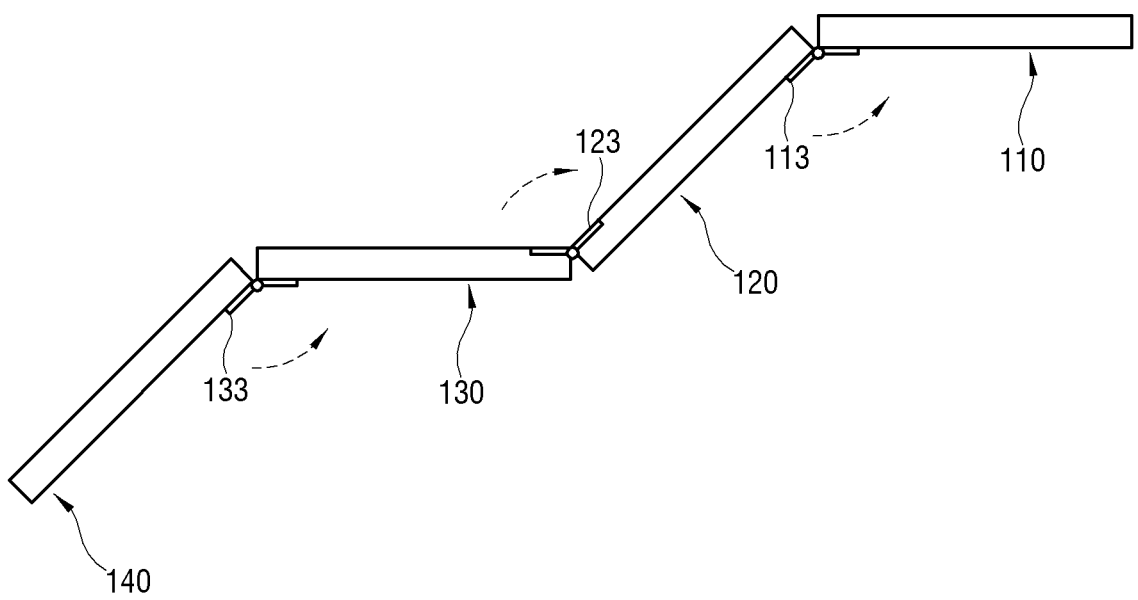
FIG. 5 is a diagram illustrating an example foldable structure for a display apparatus according to various embodiments.
Figure 6:
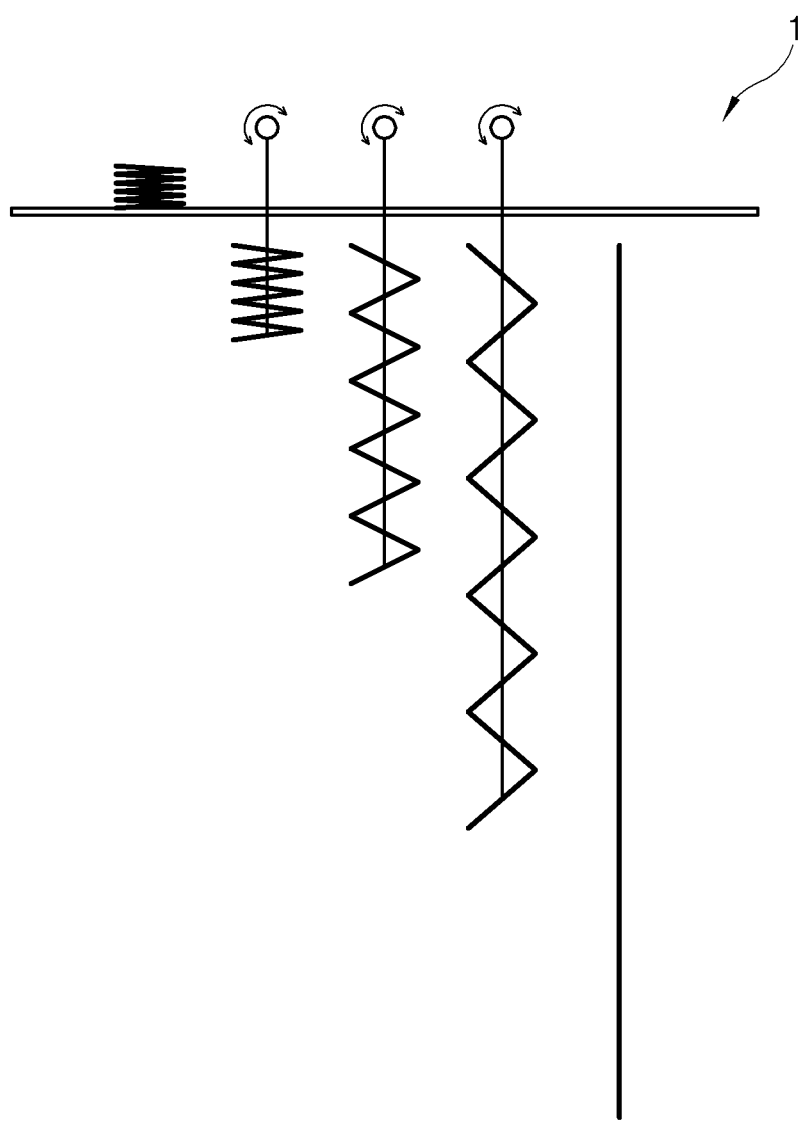
FIG. 6 is a diagram illustrating an example of sequential folding of an example display apparatus according to various embodiments.
Figure 7:
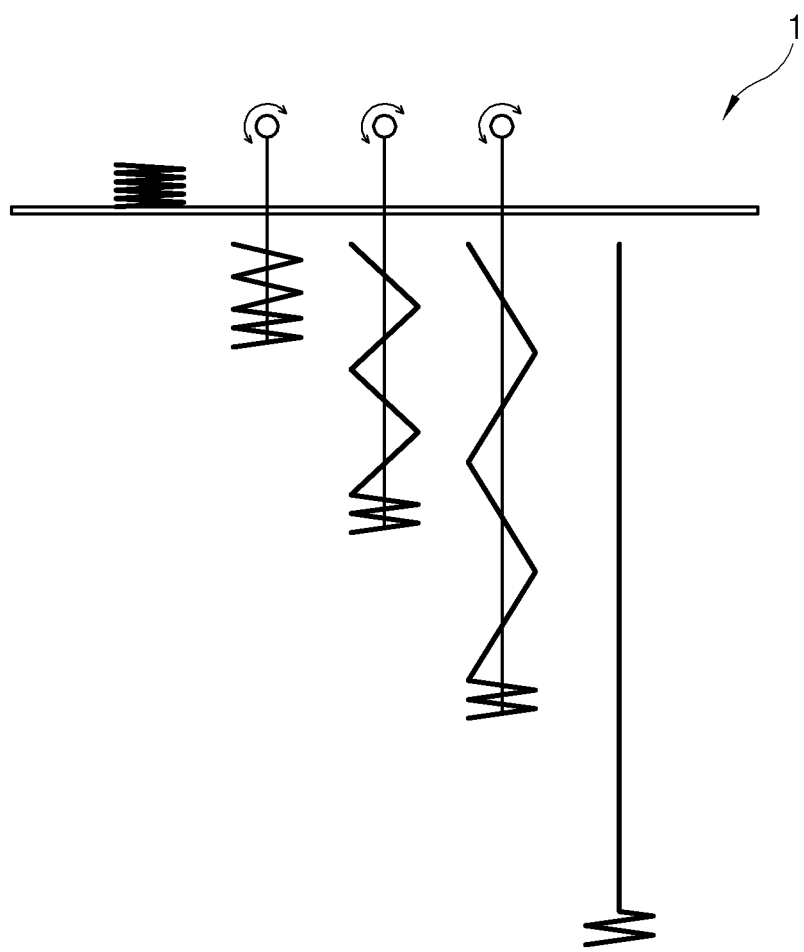
FIG. 7 is a diagram illustrating an example of sequential unfolding of an example display apparatus according various embodiments.

FIGS. 1, 2 and 3 are diagrams illustrating examples of an installed display apparatus according to various embodiments, FIG. 4 is a perspective view illustrating an example display apparatus according various embodiments, FIG. 5 is a diagram illustrating an example foldable structure of the display apparatus according various embodiments, and FIGS. 6 and 7 are diagrams illustrating example sequential folding and unfolding of the display apparatus according to various embodiments.

As illustrated in FIGS. 1, 2 and 3, the display apparatus 1 according to an embodiment of the disclosure may be embodied in a form of being stationarily installed on a ceiling, a wall, an upper portion of a window frame, etc. and including a display 100 forming a screen to display an image on a front surface thereof. For example, the display apparatus 1 may be embodied as a large format display (LFD) installable on a ceiling, etc. of a household.

In the display apparatus 1 according to an embodiment, the display 100 forming the screen may be, as shown in FIG. 4, embodied as a modular-type display in which a plurality of display modules 110, 120, 130 and 140 are arranged in a predetermined direction, for example, up and down directions.

FIG. 4 is a rear perspective view illustrating the plurality of display modules 110, 120, 130 and 140, which comprise the display 100 according to various embodiments.

According to an embodiment, physical objects 111, 121, 131, 141 may be respectively mounted to the back of the display modules 110, 120, 130 and 140, as shown in FIG. 4, each physical object may include, for example, a T-con board provided with a driver 170 (see FIG. 16) for driving each of the display modules 110, 120, 130 and 140, an imaging board provided with an image processor 530 (see FIG. 16) for outputting an image signal, a power board provided with a power supply 540 (See FIG. 16) for supplying power, etc. Each of the physical objects 111, 121, 131 and 141 may be embodied in such a form that various configurations such as the driver 170, the image processor 530, the power supply 540, etc. are accommodated in a cabinet forming an outer appearance (e.g., a frame).

However, there are no limits to positions where the foregoing configurations are installed. According to an embodiment, the physical objects may be installed at the position where the display apparatus 1 is stationarily placed, for example, the ceiling, etc. and at least some of the T-con board, the imaging board and the power board may be provided in the corresponding physical objects. For example, the T-con boards and the power boards are installed on the backs of the display modules 110, 120, 130 and 140, and the imaging board may be installed on the ceiling. According to another embodiment, for example, a separate additional device (e.g. a media box or a one-connect (OC) box) connectable to the display 1000 by a wire or wirelessly may be provided, and at least one among the T-con board, the imaging board and the power board may be provided in the corresponding device.

In the display apparatus 1 according to the disclosure, there are no limits to the number and arranged direction of display modules. However, the configuration of the display 100 according to the disclosure is not restricted, and therefore the display 100 including the display modules different in number from those shown in FIG. 4 (see FIG. 15) also belongs to the disclosure to be described below. Further, the plurality of display modules arranged left and right with its one side, e.g. a left or right side stationarily placed in the wall or the like may also belong to the display apparatus 1 according to the disclosure.

Below, the display apparatus according to the disclosure will be described based on an example embodiment in which the display 100 includes the plurality of display modules 110, 120, 130 and 140 as shown in FIG. 4 by way of non-limiting example for ease and convenience of explanation.

The plurality of display modules 110, 120, 130 and 140 may switch between a first state as folded as shown in FIG. 1 and a second state as unfolded as those shown in FIG. 2, thereby achieving a foldable display which can be folded and unfolded in up and down directions.

For example, the plurality of display modules 110, 120, 130 and 140 may have a foldable structure in which adjacent display modules forming one pair, for example, first and second display modules 110 and 120, second and third display modules 120 and 130, or third and fourth display modules 130 and 140 are rotatably chained as shown in FIG. 5, so that the plurality of display modules 110, 120, 130 and 140 can be folded in the first state.

According to an embodiment, the plurality of display modules 110, 120, 130 and 140 is, as shown in FIG. 4, controlled by a first driver 220 to switch between the first state and the second state, but a controller for changing the state of the plurality of display modules 110, 120, 130 and 140 according to the disclosure is not limited to the first driver 220. For example, the state switching may be controlled by another driver or controller.

Between the display modules 110, 120, 130 and 140 may be provided joining units for joining the adjacent display modules.

In the display apparatus 1 according to an embodiment of the disclosure, a plurality of hinges 113, 123 and 133 may be provided as a plurality of joining units for joining the adjacent display modules.

The hinges 113, 123 and 133 can provide a swing axis on which swing can be enabled between the display modules forming one pair among the plurality of display modules 110, 120, 130 and 140 so that the plurality of display modules 110, 120, 130 and 140 can switch between the first state and the second state.

The display apparatus 1 may be embodied in such a form that the plurality of hinges 113, 123 and 133 are provided between the display modules 110, 120, 130 and 140.

For example, when the display 100 includes the first to fourth display modules 110, 120, 130 and 140 as shown in FIGS. 4 and 5, the plurality of hinges 113, 123 and 133 may be respectively provided in between the first and second display modules 110 and 120, between the second and third display modules 120 and 130 and between the third and fourth display modules 130 and 140.

Referring to FIG. 5, the hinge 123 between the second and third display modules 120 and 130 is provided to swing in the opposite direction to that of the hinge 113 between the first and second display modules 110 and 120, and the hinge 133 between the third and fourth display modules 130 and 140 is provided to swing in the same direction as that of the hinge 113 between the first and second display modules 110 and 120.

Therefore, the swing directions between the display modules 110, 120, 130 and 140 may be opposite to each other in sequence, thereby allowing the plurality of display modules 110, 120, 130 and 140 to have a foldable structure.

According to an embodiment, the display apparatus 1 may further include a film as the plurality of joining units for joining the adjacent display modules, the film covering the plurality of hinges 113, 123 and 133 and a hinge region where each of the hinges 113, 123 and 133 is installed. The film may for example and without limitation include a clear polyimide (CPI) film.

As described above, the display apparatus 1 provided with the film may be embodied in such a form that the plurality of display modules 110, 120, 130 and 140 are connected by the film.

The plurality of display modules folded in the first state may be, as shown in FIG. 1, fixed to a higher position, for example, the ceiling, etc.

In the display apparatus 1 according to an embodiment, the plurality of display modules 110, 120, 130 and 140 folded and fixed to the higher position may switch to a completely unfolded state (e.g., the second state) as shown in FIG. 2 as the display modules 110, 120, 130 and 140 in the folded-up state (e.g., the first state) may be gradually unfolded and slowly moved down as shown in FIG. 6. The display modules 110, 120, 130 and 140 may gradually switch from the first state to the second state, for example, by gravity.

The plurality of display modules 110, 120, 130 and 140 unfolded in the second state may form one integrated screen on the front surface as shown in FIG. 3, so that the display 100 can display an image.

In the display apparatus 1 according to an embodiment, the plurality of display modules 110, 120, 130 and 140 folded and fixed to the higher position, may slowly move down while some upper display modules, for example, the first and second display modules 110 and 120 among the display modules 110, 120, 130 and 140 in the folded-up state (e.g., the first state) are gradually unfolded as shown in FIG. 7. Therefore, the screen is formed by some display modules 110 and 120 switched to the completely unfolded state (e.g., the second state), so that the display 100 can display an image.

The display apparatus 1 may include a driver for driving the plurality of display modules 110, 120, 130 and 140 to move up or down as described above, thereby switching between the first state and the second state. According to the disclosure, the driver may be variously provided and may for example and without limitation include a wire 210 and the driver 220.

According to the disclosure, a first driver 220 may refer, for example, to an element for driving the wire 210 to move up and down, so as to be distinguished from a driver integrated circuit (IC) provided as a second driver 170 to be described later (see FIG. 16) for driving the display modules 110, 120, 130 and 140.

For example, the display apparatus 1 may include the wire 210 supporting the plurality of display modules 110, 120, 130 and 140 as shown in FIG. 4.

According to an embodiment, the wire 210 may be fastened to as least some among the plurality of display modules 110, 120, 130 and 140.

For example, the wire 210 may be provided to form a pair and fastened to opposite sides of at least one of the display modules 110, 120, 130 and 140, thereby supporting the plurality of display modules 110, 120, 130 and 140. The wire 210 may for example be fastened to the opposite sides of the bottommost display module 140, and there are no limits to the number and positions of display modules to which the wire 210 according to the disclosure is fastened.

To prevent and/or avoid the wire 210 from coming off by the state switching of the display modules 110, 120, 130 and 140 when the wire 210 moves up and down, a ring or the like may be provided to be attached to a lateral portion of each of the display modules 110, 120, 130 and 140, so that the ring can allow the wire 210 moving up and down to pass therethrough but prevent the wire 210 from separating from the display modules 110, 120, 130 and 140.

The wire 210 may receive a driving force from the first driver 220 and be driven to move up or down as one end thereof is bound and wound in the ceiling or the like on which the display apparatus 1 is installed. The wire 210 may serve as a braking guide for preventing and/or reducing the likelihood of the display modules 110, 120, 130 and 140 suddenly falling during the process of switching to the second state, because the first driver 220 controls the moving speed of the wire 210.

In the display apparatus 1 according to an embodiment, the first driver 220 drives the wire 20 to move up or down as shown in FIG. 6 and FIG. 7, so that the display modules 110, 120, 130 and 140 can switch between the first state and the second state.

In the display apparatus 1 according to an embodiment of the disclosure, the first driver 220 may for example include a motor to provide a driving force for moving the wire 210 up and down, but may be variously embodied without limitations. Further, there are no limits to the positions where the first driver 220 is installed. For example, the first driver 220 may be installed in the ceiling on which the display apparatus 1 is fixed.

According to an embodiment, the display apparatus 1 may be embodied in such a form that the physical objects including the first driver 220 are installed in the fixed position, for example, the ceiling. The physical objects may be embodied in such a form that the first driver 220 and the like elements are accommodated in a cabinet forming an outer appearance (e.g., a frame).

According to an embodiment, the physical objects installed in the ceiling may further include at least one among the T-con board provided with the second driver 170 for driving the display modules 110, 120, 130 and 140, the imaging board on which the image processor 530 is embodied to output an image signal, and the power board on which the power supply 540 is embodied to supply power.

However, there are no limits to the positions where the foregoing elements are installed. For example, the first driver 220, the power supply 540, the image processor 530, etc. may be provided inside a separate device (e.g., an auxiliary device or an appended device) connectable to the display 100 by a wire or wirelessly. Further, the display apparatus 1 according to the disclosure may include the second driver 170, the power supply 540, and the like circuit components distributively installed inside the physical objects 111, 121, 131 and 141 coupled to the backs of the display modules 110, 120, 130 and 140 as described above.

The display apparatus 1 according to the foregoing embodiments of the disclosure naturally harmonizes with surroundings without blocking a user's view in the folded-up state, e.g., the first state, and is convenient to form a screen for displaying an image in the unfolded state, e.g., the second state. Further, all or some of the plurality of display modules 110, 120, 130 and 140 are configured to selectively switch to the second state and display an image on the display modules being in the second state, thereby forming the screen to dynamically have various sizes/shapes according to characteristics of content or tastes of a user.

Below, a coupling structure based on swing of the plurality of display modules 110, 120, 130 and 140 in the display apparatus 1 according to an embodiment of the disclosure will be described with reference to the accompanying drawings.

Figure 8:
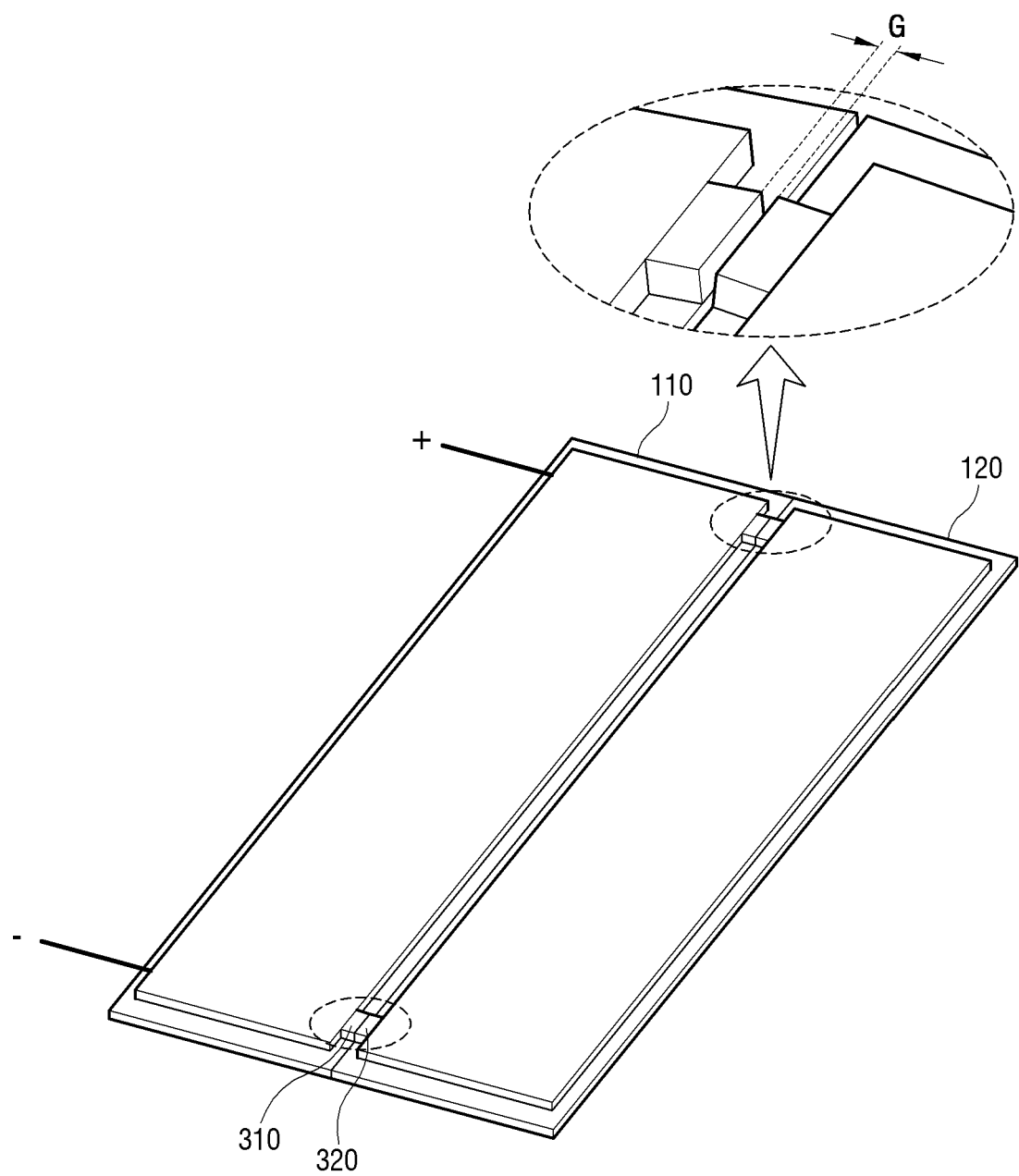
FIG. 8 is a diagram illustrating an example coupling guide provided for coupling between display modules in an example display apparatus according various embodiments.
Figure 9:
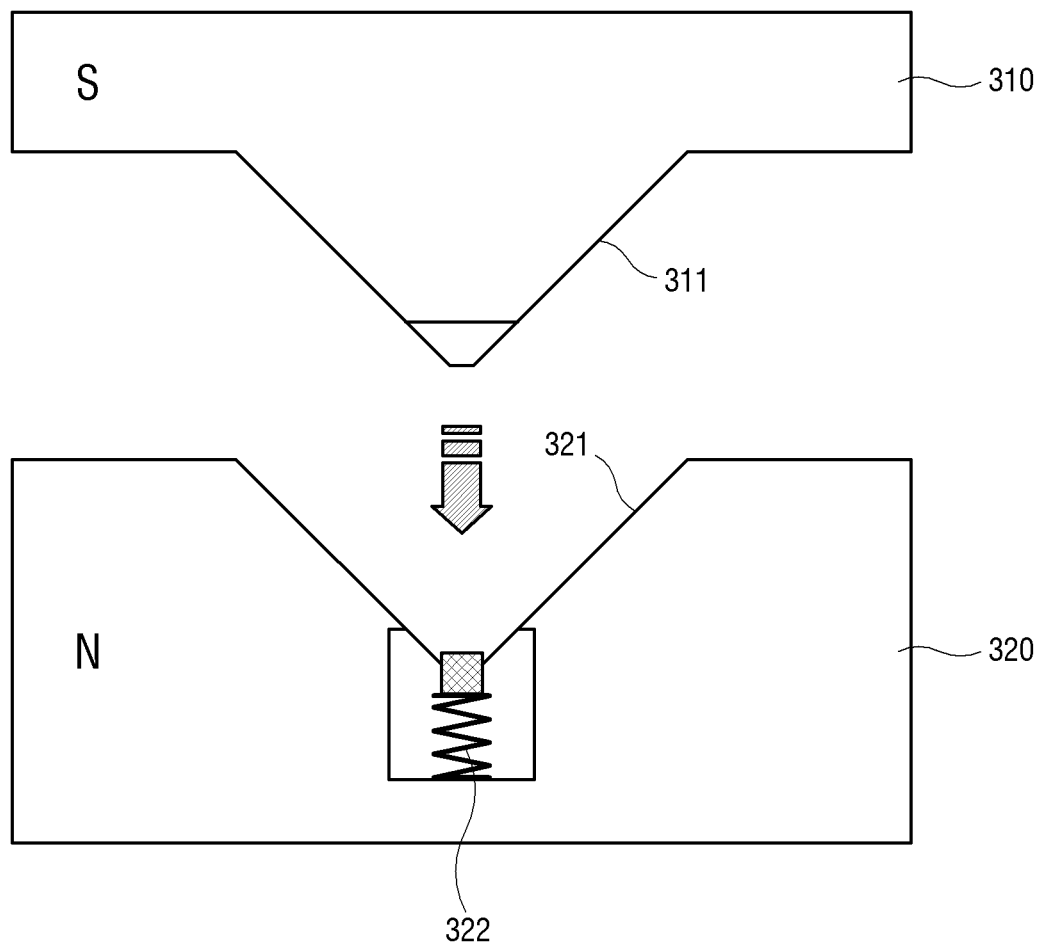
FIG. 9 is a diagram illustrating example coupling by a coupling guide of example display modules according to various embodiments.
Figure 10:
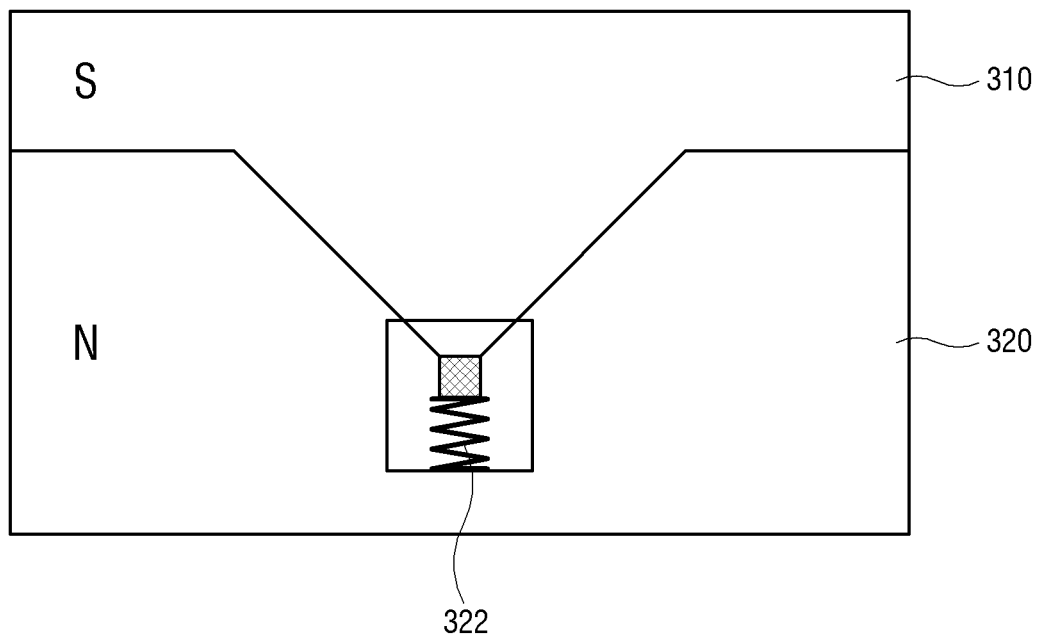
FIG. 10 is a diagram illustrating example coupling by a coupling guide of example display modules according to various embodiments.

FIG. 8 is a diagram illustrating an example structure including a coupling guide provided for coupling between display modules in a display apparatus according to various embodiments, and FIGS. 9 and 10 are diagrams illustrating examples of the display modules coupled by the coupling guide in the display apparatus according various embodiments.

In the display apparatus 1 according to an embodiment, a pair of adjacent display modules, for example the first and second display modules 110 and 120 may include a pair of coupling guides 310 and 320 on the lateral sides thereof facing each other so that one pair of display modules, e.g., the first and second display modules 110 and 120 can couple with each other in the second state as shown in FIG. 8.

FIG. 8 shows an example that two pairs of coupling guides 310 and 320 are provided leaving a predetermined space therebetween on the opposite lateral sides of the first and second display modules 110 and 120. However, the coupling guides 310 and 320 according to the disclosure may form one or more pairs, and the number of coupling guides is not limited to that shown in FIG. 8. Further, the installation positions of the coupling guides 310 and 320 may be variously embodied without being limited to that shown in FIG. 8.

According to an embodiment, the coupling guides 310 and 320 provided on the opposite lateral sides of one pair of adjacent display modules of the display apparatus 1 may include magnets to couple with each other.

For example, the display apparatus 1 may, as shown in FIG. 8, have a predetermined space, e.g., gap G in a seam between the adjacent display modules forming a pair, for example, the first and second display modules 110 and 120 in the second state.

In the display apparatus 1 according to an embodiment of the disclosure, the pair of coupling guides 310 and 320 may, as shown in FIG. 9, be embodied by magnets having polarities opposite to each other, so that the display modules 110 and 120 can seamlessly couple with each other as shown in FIG. 10 by the magnetism, in other words, the attractive force of the magnets.

According to an embodiment, one pair of coupling guides 310 and 320 may include a protruding portion 311, and the other a recessed portion 321 accommodating the protruding portion 321 in the second state.

The protruding portion 311 may be provided in the upper coupling guide 310, and shaped, for example, and without limitation, like a protrusion having a triangular cross-section as shown in FIG. 9. For example, the protruding portion 311 may have various shapes such as a triangular pyramid, a quadrangular pyramid, a cone, etc.

The recessed portion 321 may be provided in the lower coupling guide 320, and variously shaped corresponding to the protruding portion 311 so as to accommodate and fitted to the protruding portion 311 as shown in FIG. 9. The lower coupling guide 320 may include a spring or the like elastic member 322 under the recessed portion 321, thereby absorbing a shock applied in a vertical direction when the protruding portion 311 and the recessed portion 321 are coupled.

With the foregoing coupling structure, as shown in FIG. 10, the coupling guides 310 and 320 forming a pair engage with each other as the protruding portion 311 is accommodated in the recessed portion 321 by the attractive force of the magnet, so that one pair of adjacent display modules 110 and 120 can be matched and coupled without leftward and rightward movement in the second state.

Therefore, in the display apparatus 1 according to an embodiment of the disclosure, the display modules 110, 120, 130 and 140 of the folded-up state (e.g., the first state) are gradually unfolded and slowly moved down to switch to the completely unfolded state (e.g., the second state) as shown in FIGS. 6 and 7, the display modules 110, 120, 130 and 140 in the second state are seamlessly coupled/locked to each other by both the magnetism of the coupling guides 310 and 320 provided facing with each other in the seams between the display modules 110, 120, 130 and 140 and the engagement of the protruding portion 311 and the recessed portion 321.

According to an embodiment, at least one magnet of the coupling guides 310 and 320 may include an electromagnet.

Figure 11:
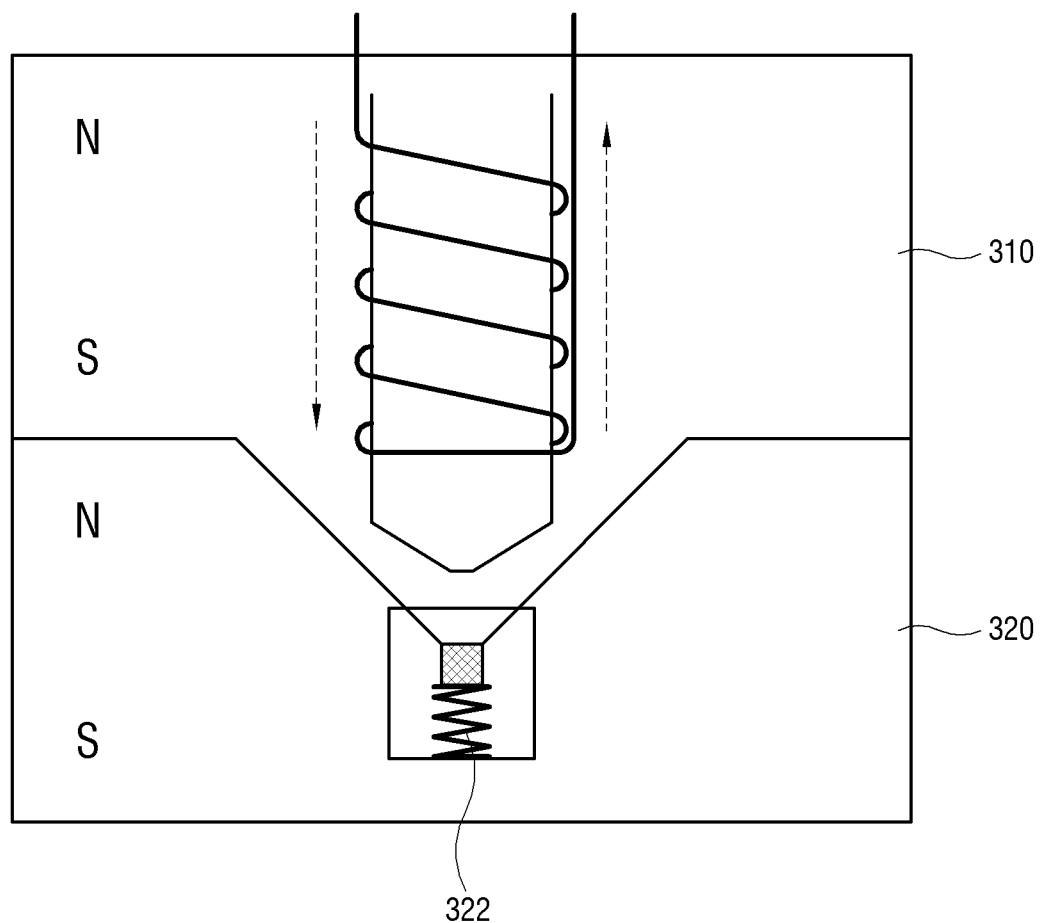
FIG. 11 is a diagram illustrating an example electromagnet between a pair of coupling guides in an example display apparatus according various embodiments.
Figure 12:
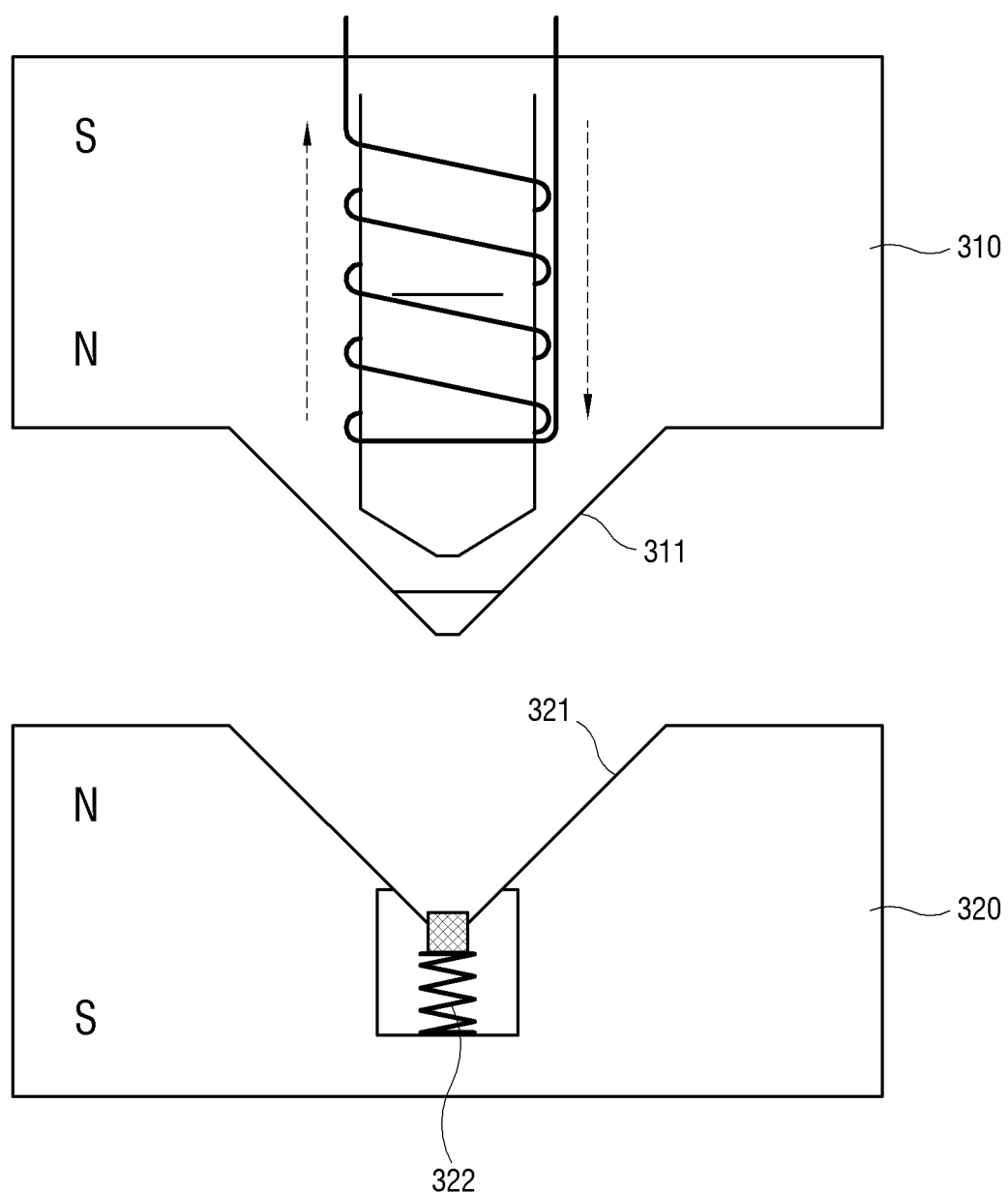
FIG. 12 is a diagram illustrating an example electromagnet between a pair of coupling guides in an example display apparatus according to various embodiments.

FIGS. 11 and 12 are diagrams illustrating examples in which one between the pair of coupling guides for coupling the display modules includes an electromagnet in the display apparatus according to various embodiments.

In the display apparatus 1 according to an embodiment, one of the coupling guides 310 and 320 forming one pair to couple the display modules 110, 120, 130 and 140 in the second state, for example, the upper coupling guide 310 may, as shown in FIGS. 11 and 12, be embodied as an electromagnet of which polarity is alterable. In this case, the other one, e.g., the lower coupling guide 320 may be embodied as a permanent magnet.

When the display modules 110, 120, 130 and 140 switch from the first state to the second state, the electromagnet may be controlled to change polarity by changing a flowing direction of an electric current so that one pair of coupling guides 310 and 320 can be attached to each other.

For example, when the display modules 110, 120, 130 and 140 switch from the first state to the second state, as shown in FIG. 11, the electromagnet of the upper coupling guide 310 may be controlled to have the S pole at an end portion thereof so as to be attached to the N pole at an end portion of the lower coupling guide 320. Here, the end portions of the coupling guides 310 and 320 may have different polarities. In other words, the upper coupling guide 310 may have the N pole at the end portion thereof, and the lower coupling guide 320 may have the S pole at the end portion thereof.

Further, when the display modules 110, 120, 130 and 140 switch from the second state to the first state, the electromagnet may be controlled to change polarity by changing the flowing direction of the electric current so that one pair of coupling guides 310 and 320 can be detached from each other.

For example, when the display modules 110, 120, 130 and 140 switch from the second state to the first state, as shown in FIG. 12, the electromagnet of the upper coupling guide 310 may be controlled to have the N pole at the end portion thereof so as to be detached from the N pole at the end portion of the lower coupling guide 320. Here, the end portions of the coupling guides 310 and 320 may have different polarity. In other words, the upper coupling guide 310 may have the S pole at the end portion thereof, and the lower coupling guide 320 may have the S pole at the end portion thereof.

Figure 13:
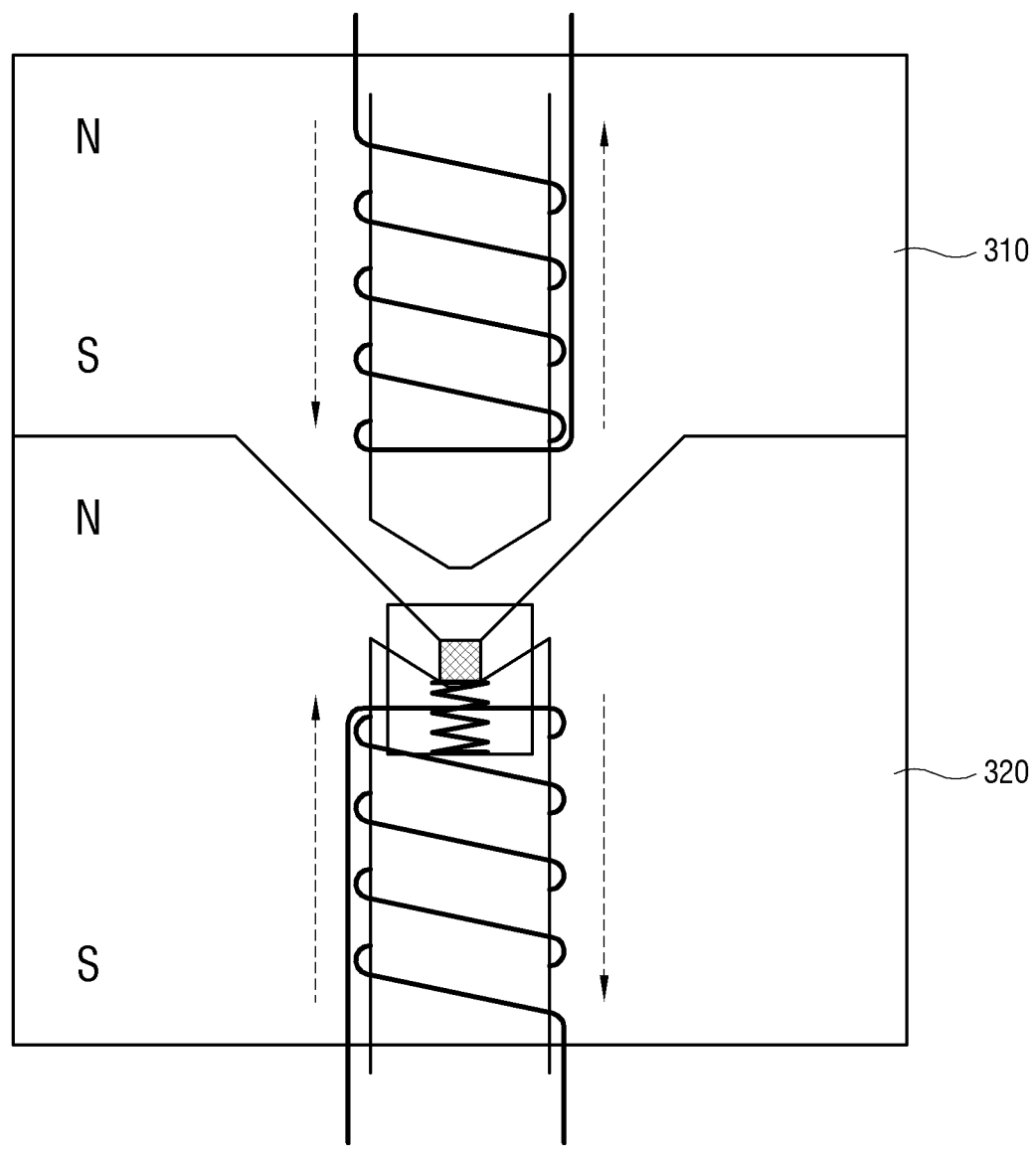
FIG. 13 is a diagram illustrating an example pair of coupling guides including electromagnets in an example display apparatus according to various embodiments.
Figure 14:
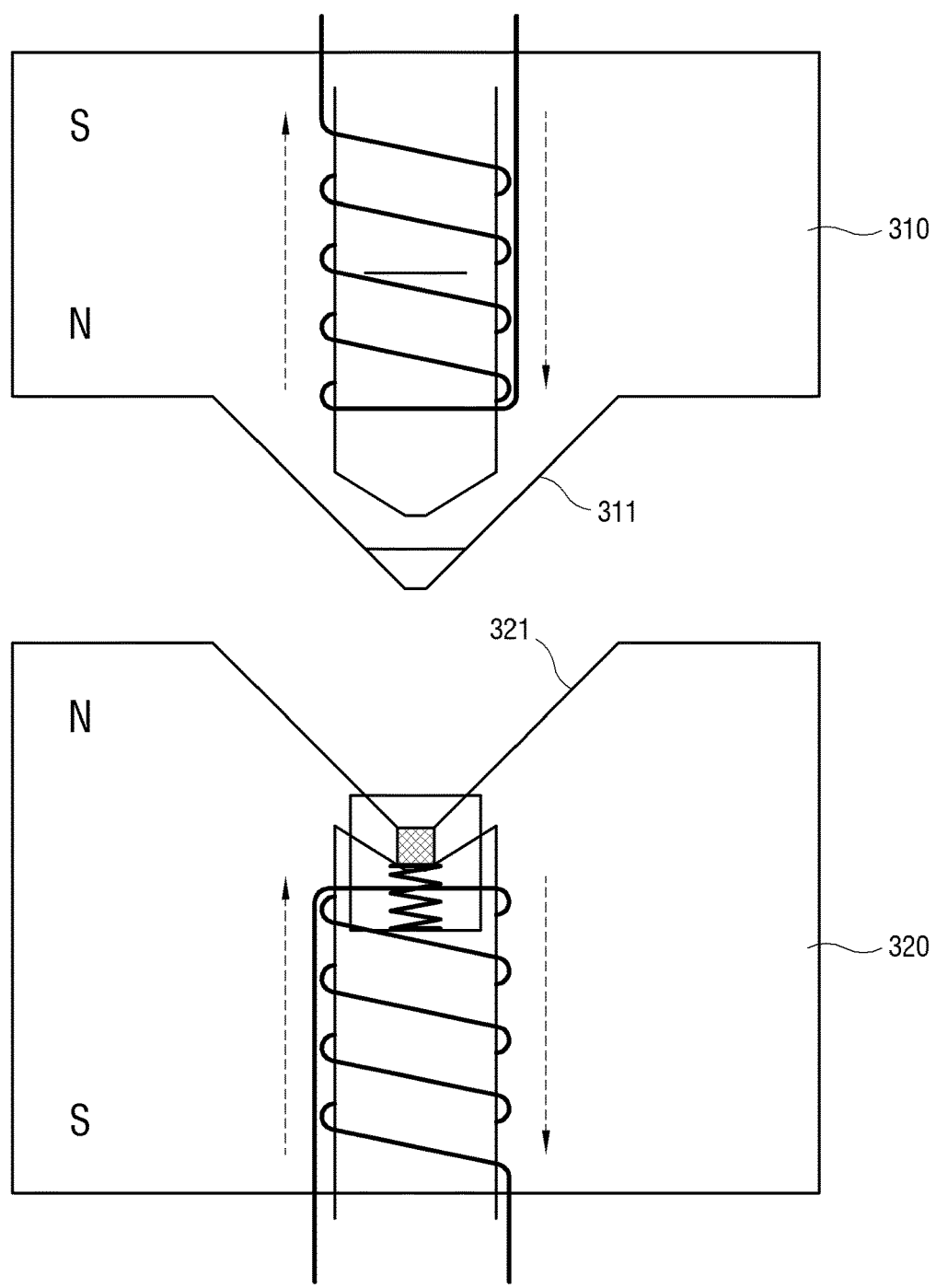
FIG. 14 is a diagram illustrating an example pair of coupling guides including electromagnets in an example display apparatus according various embodiments.

FIGS. 13 and 14 are diagrams illustrating examples in which the pair of coupling guides for coupling the display modules include electromagnets in the display apparatus according various embodiments.

In the display apparatus 1 according to an embodiment, the pair of coupling guides 310 and 320 provided for coupling the display modules 110, 120, 130 and 140 in the second state may be embodied in such a form that both the upper coupling guide 310 and the lower coupling guide 320 include the electromagnets of which polarity is alterable, as shown in FIGS. 13 and 14.

When the display modules 110, 120, 130 and 140 switch from the first state to the second state, the electromagnet may be controlled to change polarity by changing the flowing direction of the electric current so that one pair of coupling guides 310 and 320 can be attached to each other.

For example, when the display modules 110, 120, 130 and 140 switch from the first state to the second state, as shown in FIG. 13, the electromagnets of the upper coupling guide 310 and the lower coupling guide 320 may be controlled so that the end portion of the upper coupling guide 310 can have the S pole (e.g., a negative electrode) and be attached to N pole (e.g., a positive electrode) at the end portion of the lower coupling guide 320. The end portions of the coupling guides 310 and 320 may be controlled to have different polarities. In other words, the upper coupling guide 310 may have the N pole at the end portion thereof, and the lower coupling guide 320 may have the S pole at the end portion thereof.

Further, when the display modules 110, 120, 130 and 140 switch from the second state to the first state, the electromagnets may be controlled to change polarity by changing the flowing direction of the electric current so that one pair of coupling guides 310 and 320 can be detached from each other.

For example, when the display modules 110, 120, 130 and 140 switch from the second state to the first state, as shown in FIG. 14, the electromagnets of the upper coupling guide 310 and the lower coupling guide 320 may be controlled so that the end portion of the upper coupling guide 310 can have the N pole (e.g., the positive electrode) and be detached from the N pole (e.g., the positive electrode) at the end portion of the lower coupling guide 320. The end portions of the coupling guides 310 and 320 may be controlled to have different polarities. In other words, the upper coupling guide 310 may have the S pole at the end portion thereof, and the lower coupling guide 320 may have the S pole at the end portion thereof.

In the display apparatus 1 according to the foregoing example embodiments of the disclosure, the electromagnet provided in at least one of the coupling guides 310 and 320 forming a pair is controlled to change its polarity, and thus easily attached to or detached from the adjacent display module as the display modules 110, 120, 130 and 140 are unfolded or folded.

According to an embodiment, when the display modules 110, 120, 130 and 140 switch from the first state to the second state, the electromagnets may be controlled to drive a plurality of pairs of coupling guides 310 and 320 to be attached in sequence from a top toward a bottom. For example, when the display 100 includes four display modules 110, 120, 130 and 140 as shown in FIG. 4, the coupling guides 310 and 320 between the first and second display modules 110 and 120 are first attached by their magnets, and the coupling guides 310 and 320 between the second and third display modules 120 and 130 are then attached by their magnets. Last, the coupling guides 310 and 320 between the third and fourth display modules 130 and 140 are attached by their magnets.

According to an embodiment, when the display modules 110, 120, 130 and 140 switch from the second state to the first state, the electromagnets may be controlled to drive the plurality of pairs of coupling guides 310 and 320 to be detached in sequence from the bottom toward the top. For example, when the display 100 includes four display modules 110, 120, 130 and 140 as shown in FIG. 4, the coupling guides 310 and 320 between the third and fourth display modules 130 and 140 are first detached by their magnets, and the coupling guides 310 and 320 between the second and third display modules 120 and 130 are then detached by their magnets. Last, the coupling guides 310 and 320 between e first and second display modules 110 and 120 are detached by their magnets.

According to an embodiment, to make some among the plurality of display modules 110, 120, 130 and 140 be in the first state, and the rest be in the second state, the electromagnets may be controlled to drive the plurality of pairs of corresponding coupling guides 310 and 320 to be selectively attached and detached.

For example, when the display 100 includes four display modules 110, 120, 130 and 140 as shown in FIG. 4 and the first and second display modules 110 and 120 selectively switch to the second state to display an image thereon, the electromagnets of the coupling guides 310 and 320 between the first and second display modules 110 and 120 being in the second state are driven to attach their coupling guides 310 and 320, but the electromagnets of the coupling guides 310 and 320 between the third and fourth display modules 130 and 140 being in the first state are driven to detach their coupling guides 310 and 320. The electromagnets of the coupling guides 310 and 320 between the second display module 120 being in the second state and the third display module 130 being in the first state are driven to detach their coupling guides 310 and 320.

Below, embodiments of supplying power or transmitting an image to the display modules in the display apparatus according to the disclosure will be described in greater detail with reference to the accompanying drawings.

Figure 15:
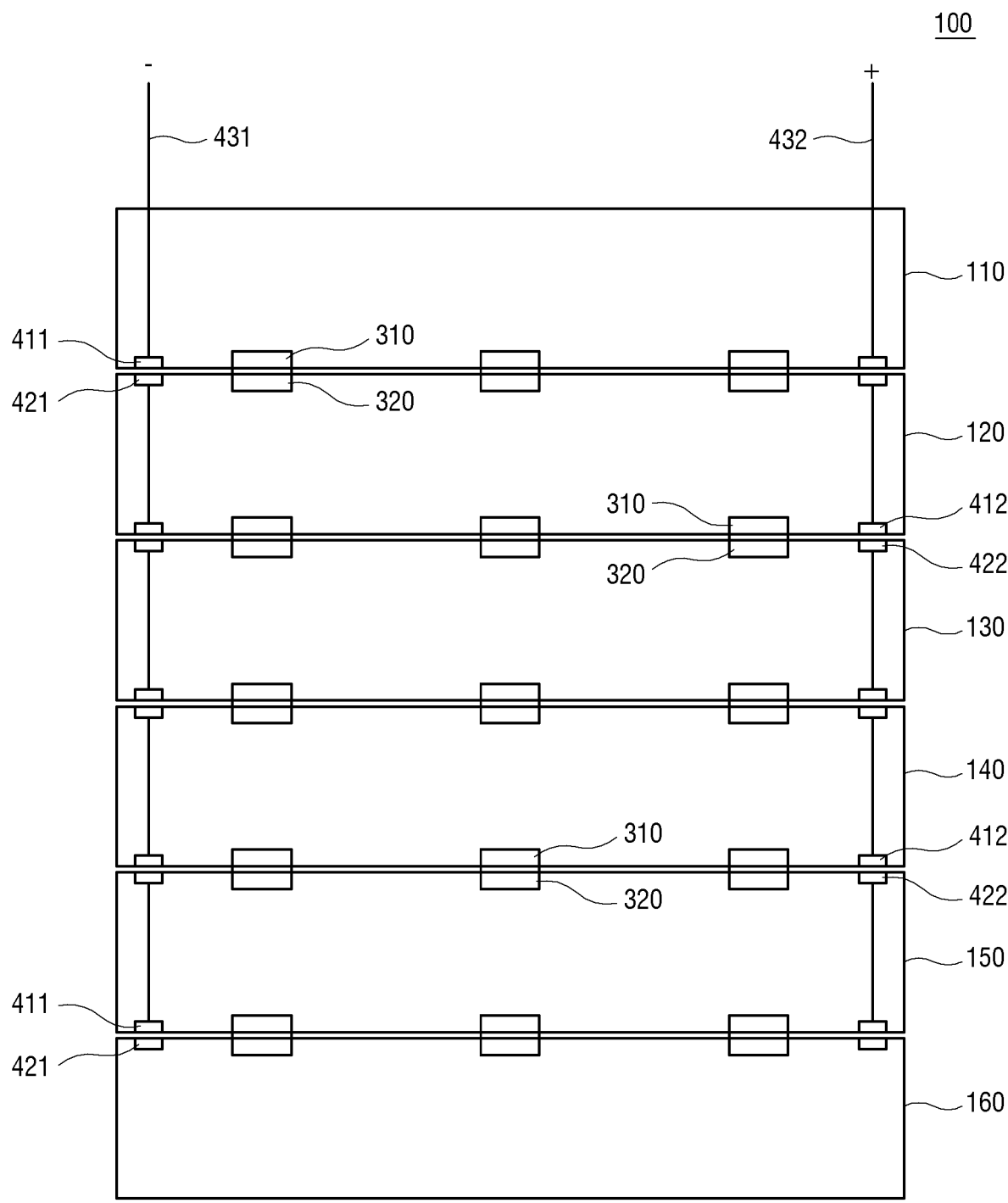
FIG. 15 is a diagram illustrating an example structure for supplying power and transmitting an image to a plurality of display modules in a display apparatus according to various embodiments.

FIG. 15 is a diagram illustrating an example structure for supplying power and transmitting an image to the plurality of display modules in the display apparatus according to various embodiments.

FIG. 15 shows an example of the display apparatus 1 in which the display 100 includes six display modules 110, 120, 130, 140, 150 and 160. There are no limits to the number of display modules in the display apparatus 1 according to the disclosure, and therefore the configuration and its drive/operation according to the foregoing embodiments may be equally applied to the display apparatus 1 including the display 100 shown in FIG. 15.

For example, the display apparatus 1 according to an embodiment shown in FIG. 15 includes the plurality of hinges is provided between the plurality of display modules 110, 120, 130, 140, 150 and 160 so that a swing can be allowed between the pair of adjacent display modules, and the wire 210 fastened to at least one display module among the plurality of display modules 110, 120, 130, 140, 150 and 160 so that the plurality of display modules 110, 120, 130, 140, 150 and 160 can switch between the folded-up state, e.g., the first state and the unfolded state, e.g., the second state as the wire 210 moves up and down by the first driver 220.

The display apparatus 1 may include the pair of coupling guides 310 and 320 with the magnets provided on the opposite lateral sides of the adjacent display modules forming a pair, for example, as shown in FIG. 15, the first and second display modules 110 and 120, the second and third display modules 120 and 130, the third and fourth display modules 130 and 140, the fourth and fifth display modules 140 and 150, and the fifth and sixth display modules 150 and 160, in which the magnets are driven to be attached to each other by its magnetism in the second state and detached from each other by its magnetism in the first state as described with reference to FIGS. 8, 9, 10, 11, 12, 13 and 14. The magnet of at least one between the coupling guides 310 and 320 forming a pair includes the electromagnet which is controlled to be driven as its polarity is altered by change in the direction of the electric current at switching between the first state and the second state.

FIG. 15 illustrates an example that three pairs of coupling guides 310 and 320 arranged with a predetermined space therebetween are provided on the opposite lateral sides of the adjacent display modules forming a pair, for example, the first and second display modules 110 and 120. However, the number and positions of coupling guides 310 and 320 according to the disclosure are not limited to those shown in FIG. 15.

According to an embodiment, the display apparatus 1 may include a pair of first connectors 411 and 421 connectable to each other, which are provided on the opposite lateral sides of the adjacent display modules forming a pair, for example, the first and second display modules 110 and 120, as shown in FIG. 15.

The pair of first connectors 411 and 421 are provided with a first signal line 431 to transmit power or an image to the display modules 110, 120, 130, 140, 150 and 160. The pair of first connectors 411 and 421 are attached to each other to connect the first signal lines 431 to each other in the first state, but detached from each other to disconnect the first signal lines 431 in the second state.

The display apparatus 1 controls the electromagnets of the coupling guides 310 and 320 to be driven as described above, so that the adjacent display modules forming a pair can be attached to each other by the magnets of the coupling guides 310 and 320 in the second state, thereby allowing the first connectors 411 and 421 to be naturally attached to each other. Further, the electromagnets of the coupling guides 310 and 320 are controlled to be driven, so that the adjacent display modules forming a pair can be detached from each other by the magnets of the coupling guides 310 and 320 in the first state, thereby allowing the first connectors 411 and 421 to be naturally detached from each other.

When the first connectors 411 and 421 provided on the opposite lateral sides of the first and second display modules 110 and 120 are attached to each other, the first signal lines 431 are connected between the first and second display modules 110 and 120, so that power or an image can be transmitted from the first display module 110 to the second display module 120 through the first signal line 431.

Likewise, when the first connectors 411 and 421 provided on the opposite lateral sides of the second and third display modules 120 and 130 are attached to each other, the first signal lines 431 are connected between the second and third display modules 120 and 130, so that the power or the image can be transmitted from the second display module 120 to the third display module 130 through the first signal line 431.

According to an embodiment, in the same or similar manner as above, the display apparatus 1 is embodied to transmit the power or the image up toward the bottommost display module, for example, the sixth display module 160 shown in FIG. 15, from the top toward the bottom by a daisy chain scheme.

According to an embodiment, as shown in FIG. 15, the display apparatus 1 may further include a pair of second connectors 412 and 422 which are provided opposite the pair of first connectors 411 and 421 with the pair of coupling guides 310 and 320 between the pair of first connectors 411 and 421 and the pair of second connectors 412 and 422, placed on the opposite lateral sides of the adjacent display modules forming a pair, for example, the fourth and fifth display modules 140 and 150, and attached to each other.

The pair of second connectors 412 and 422 are provided with a second signal line 432. The pair of second connectors 412 and 422 are attached to each other to connect the second signal lines 432 in the first state, but detached from each other to disconnect the second signal line 432 in the second state. The second signal line 432 may connect with the first signal line 431 and transmit the power or the image to the display modules 110, 120, 130, 140, 150 and 160.

Like the first connectors 411 and 421, the second connectors 412 and 422 may be structured to be naturally attached to or detached from each other as the coupling guides 310 and 320 are attached to or detached by the magnets.

Further, like the first connectors 411 and 421, the second signal lines 432 are connected as the second connectors 412 and 422 provided on the opposite lateral sides of the adjacent display modules forming a pair are attached to each other, so that the power or the image can be transmitted from the topmost display module 110 up toward the bottommost display module 160 in sequence by the daisy chain scheme.

The first signal line 431 and the second signal line 432 may be configured to transmit a power or image signal, or transmit both the power and image signals. For example, the first signal line 431 and the second signal line 432 may be embodied as a cable capable of transmitting both the power and image signals. The first signal line 431 and the second signal line 432 may be provided as a cable for supplying the power, and the image signal may be transmitted through a separate signal line (e.g., wire).

In the foregoing embodiment, the display apparatus 1 is configured to transmit the power or image signal to the display modules 110, 120, 130, 140, 150 and 160 being in the second state through the daisy chain scheme by coupling as one or more connectors 411 and 421, and 412 and 422 provided with the signal lines 431 and 432 on the adjacent display modules forming a pair among the plurality of display modules 110, 120, 130, 140, 150 and 160. However, the method of transmitting the power or the image according to the disclosure is not limited to the foregoing embodiment.

According to an embodiment, the display apparatus 1 may be embodied to transmit the power or image signal by connecting the plurality of display modules 110, 120, 130, 140, 150 and 160 with a flexible wire. The flexible wire is capable of transmitting the signal even when the display modules 110, 120, 130, 140, 150 and 160 are in the first state as well as the second state, and it is therefore possible to selectively supply or shut off the power regardless of whether the display modules 110, 120, 130, 140, 150 and 160 are unfolded or folded.

According to an embodiment, the display apparatus 1 may be embodied to transmit the power or image signal as a connector provided with a separate signal line capable of transmitting the power or image signal are installed in each of the display modules 110, 120, 130, 140, 150 and 160. The separate wire may be embodied to transmit a signal even when the display modules 110, 120, 130, 140, 150 and 160 are in the first state as well as the second state, and it is therefore possible to selectively supply or shut off the power regardless of whether the display modules 110, 120, 130, 140, 150 and 160 are unfolded or folded.

Below, the elements of the display apparatus according to various embodiments will be described in greater detail with reference to the accompanying drawing.

Figure 16:
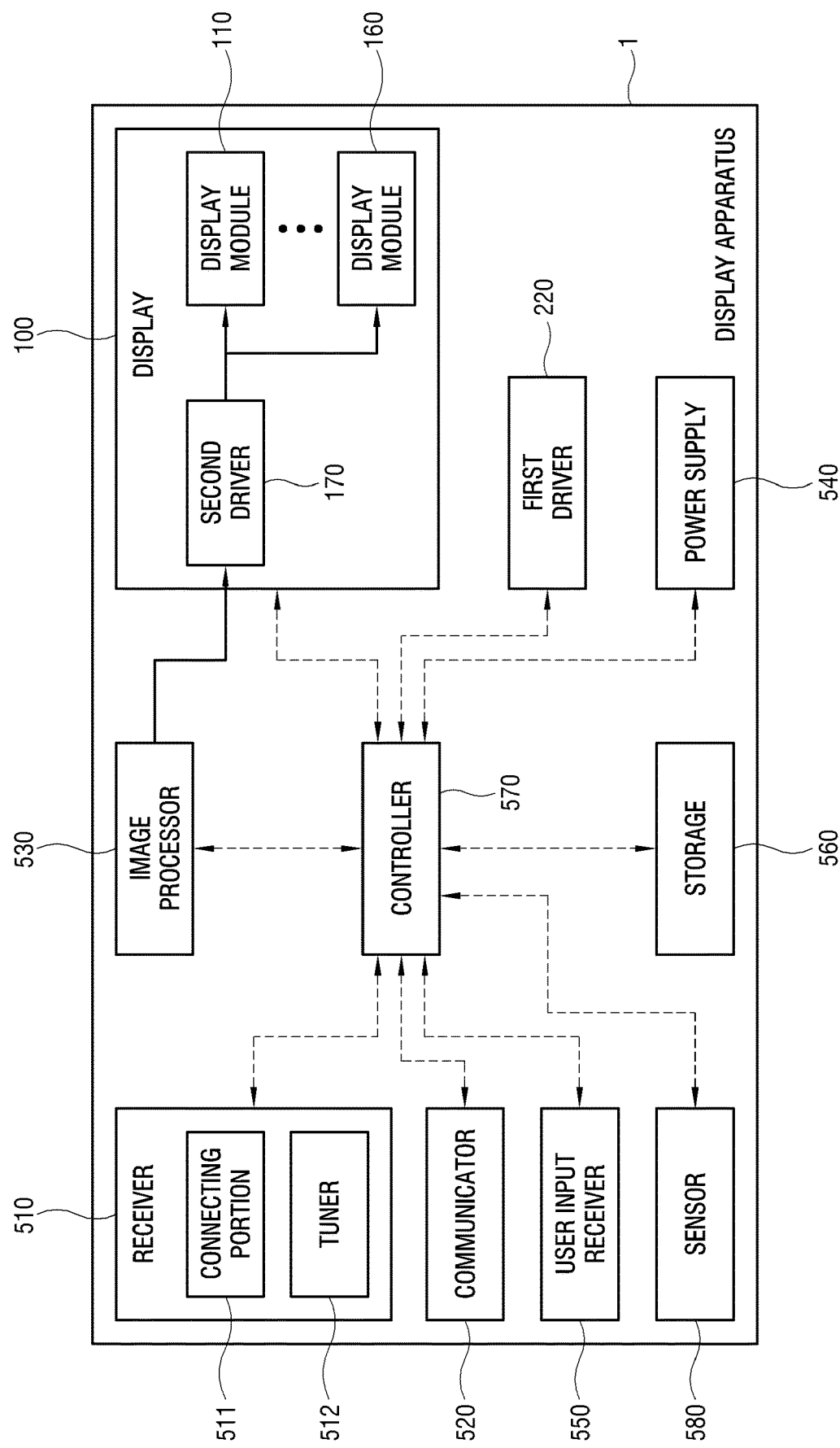
FIG. 16 is a block diagram illustrating an example configuration of an example display apparatus according to various embodiments.

FIG. 16 is a block diagram illustrating an example configuration of an example display apparatus according to various embodiments.

As shown in FIG. 16, the display apparatus 1 according to an embodiment of the disclosure includes the display 100, the first driver 220, a receiver 510, a communicator (e.g., including communication circuitry) 520, the image processor (e.g., including image processing circuitry) 530, the power supply 540, a user input receiver (e.g., including user input circuitry) 550, a storage 560, a controller (e.g., including processing circuitry) 570 and a sensor 580. However, the elements included in the display apparatus 1 are not limited to this embodiment, but may exclude some elements or include other additional elements At least one of the foregoing elements may be placed inside the physical objects such as the ceiling or the like where the display apparatus 1 is stationarily installed, or may be placed inside a separate additional device connectable to the display 100 by a wire or wirelessly. Further, as described above, at least some elements including the image processor 530, the power supply 540 may be provided as distributed in the physical objects 111, 121, 131 and 141 on the backs of the plurality of display modules 110, 120, 130, 140, 150 and 160.

The receiver 510 may include various circuitry and receives a signal (e.g. content) from an external signal source (e.g. an image source). The standards of the received signal may be varied depending on the types of the display apparatus 1. For example, the receiver 510 may receive a radio frequency (RF) signal from a broadcasting station (not shown) wirelessly, or may receive a signal based on high definition multimedia interface (HDMI), composite video, component video, super video, syndicat des constructeurs des appareils radiorécepteurs et téléviseurs (SCART), universal serial bus (USB), display port (DP) and the like standards by a wire.

According to the disclosure, there are no limits to the kinds of image sources for providing content. For example, a set-top box (STB), a personal computer (PC) such as a desktop or laptop computer, a player for an optical disc such as Blu-ray disc or digital versatile disc (DVD), a mobile device including a smart pad such as a smartphone or a tablet computer, etc. Further, the display apparatus 1 may receive content provided in the form of a real-time streaming file through a wired or wireless network.

According to an embodiment, the display apparatus 1 may be embodied in a television (TV) that displays broadcast content.

When the display apparatus 1 is embodied as the TV, the display apparatus 1 may receive and process broadcast content based on at least one of a broadcast signal, broadcast information or broadcast data from a transmitter of a broadcasting station. The display apparatus 1 may wirelessly receive a RF signal, e.g., a broadcast signal from the broadcasting station. To this end, the display apparatus 1 may include an antenna configured to receive a broadcast signal, and a tuner 512 configured to be tuned to a channel corresponding to a broadcast signal.

In the display apparatus 1, the broadcast signal may be received through a terrestrial wave, a cable, a satellite, etc., and a signal source is not limited to the broadcasting station. Any apparatus or station capable of transmitting and receiving data may be included in the image source according to the disclosure.

According to an embodiment, the display apparatus 1 may operate as a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application may refer, for example, to an application program for providing various kinds of services, for example, a social network service (SNS), finance, news, weather, a map, music, a movie, a game, an electronic book, etc.

The receiver 510 may include a connecting portion (e.g., including a connector) 511 for wired connection between the display apparatus 1 and the external signal source (e.g. the image source). According to an embodiment, the connecting portion 511 may connect with the image source through an HDMI cable, but the connection is not limited to the HDMI.

The display apparatus 1 may receive a signal of content from a set-top box or the like image source through the wired-connected connecting portion 511. The signal of the content includes a broadcast signal. The connecting portion 511 basically receives a signal from the image source, but may be configured to interactively transmit and receive a signal.

The connecting portion 511 may be embodied as a communication circuitry including a data input/output interface where communication modules (e.g. a S/W module, a chip, etc.), port, etc. are combined corresponding to predetermined communication protocols.

According to an embodiment, the apparatus connected to the display apparatus 1 by a wire through the connecting portion 511 may be the set-top box, the PC or the like external apparatus, but the disclosure is not limited to this embodiment. For example, the display apparatus 1 according to an alternative embodiment may connect with a mobile apparatus by a wire through the connecting portion 511.

According to an embodiment, when the received signal is a broadcast signal, the receiver 510 includes the tuner 512 to be tuned to the channels corresponding to the broadcast signals. The tuner 512 may include a demodulator that demodulates a broadcast signal of a certain tuned channel and outputs a signal in the form of a transport stream (TS). In other words, the tuner and the demodulator may be designed as a single integrated chip, or may be respectively designed as separated two chips.

Further, the signal may be based on data stored in a flash memory, a hard disk drive, or the like nonvolatile storage 560. The storage 560 may be provided inside or outside the display apparatus 1. When the storage 560 is provided in the outside, the storage 560 may be connected to the display apparatus 1 through the connecting portion 511.

The communicator 520 may include various communication circuitry and performs wired or wireless communication with at least one external apparatus including an image source. The display apparatus 1 may receive a signal of content from the image source through the communicator 520.

The communicator 520 may be embodied by a communication circuitry including wired or wireless communication modules (e.g. an S/W module, a chip, etc.) corresponding to various kinds of communication protocols.

According to an embodiment, the communicator 520 includes a wireless local area network (WLAN) unit. The WLAN unit may be wirelessly connected to an external apparatus through an access point (AP) under control of the controller 570. The WLAN unit includes a Wi-Fi communication module.

According to an embodiment, the communicator 520 includes a short-range communication module that support wireless direct communication between the display apparatus 1 and the external apparatus without the access point (AP). The short-range communicate module may employ at least one of Wi-Fi Direct, Bluetooth, Bluetooth low energy, RF communication, infrared data association (IrDA), Zigbee, ultrawideband (UWB), and near field communication (NFC), When the display apparatus 1 performs direct communication with the external apparatus, the storage 560 may be configured to store address information (e.g. media access control (MAC) address or Internet protocol (IP) address) about the external apparatus with which the communication will be performed.

In the display apparatus 1 according to an embodiment of the disclosure, the communicator 520 is configured to perform wireless communication with the external apparatus by at least one of the WLAN unit and the short-range communication module according to its performance.

According to an embodiment, the communicator 520 may include Ethernet and the like wired communication module.

According to an embodiment, the display apparatus 1 may receive video content from an external sever or the like image source through the communicator 520 by a real-time steaming method. For example, the display apparatus 1 may receive content from, for example, Netflix, YouTube or the like service by the streaming method.

The image processor 530 may include various image processing circuitry and performs various preset video/audio processes with regard to a signal of content. The image processor 530 outputs an image signal generated or combined by performing such processes to the display 100, so that an image based on the image signal can be displayed on the display 100. The image signal processed in the image processor 530 may be based on data stored in a flash memory, a hard disk drive, or the like nonvolatile storage 550.

The image processor 530 may include a video decoder for decoding an image signal to have an image format of the display apparatus 1, and a scaler for adjusting the image signal to correspond to the output standards of the display 100.

According to an embodiment, the decoder may for example be embodied by an H.264 decoder, but not limited thereto. In other words, the video decoder in this embodiment may for example be embodied by a moving picture experts group (MPEG) decoder, a high efficiency video codec (HEVC) decoder, or the like decoders corresponding to various compression standards.

Further, there are no limits to the kinds of content to be processed by the image processor 530 according to the disclosure. For example, the content to be processed by the image processor 530 may include not only a moving picture like a video, but also a still picture such as a picture of joint photographic experts group (JPEG) file, a background image, etc.

The content to be processed by the image processor 530 may include content data corresponding to a displayed image and meta data as appended data of the content data according to its kinds.

There are no limits to the kinds of video processing process performed in the image processor 530. For example, the image processor 530 may for example perform at least one of various processes such as de-interlacing for converting an interlaced broadcast signal into a progressive broadcast signal, detail enhancement, frame refresh rate conversion, line scanning, etc.

The image processor 530 may be embodied by a group of individual components for independently performing processes to process an image signal, or a main system-on-chip (SoC) where various functions are integrated. The main SoC may further include at least one processor provided to generally control the main body 100. The main SoC may further include at least one application processor, a microprocessor or a CPU embodied as an example of the controller 570 (to be described later).

According to an embodiment, the image processor 530 may be embodied by a video board including circuit elements such as various chipsets for performing respective processes, a memory, electronic parts, wirings, etc. which are mounted on to a printed circuit board (PCB). In this case, the image processor 530 and the controller 570 of the display apparatus 1 may be provided on a single video board. Of course, this is merely an example, and they may be arranged on a plurality of PCBs connecting and communicating with each other.

The signal processed by the image processor 530 is output to the display 100.

The display 100 includes the plurality of display modules 110, 120, 130, 140, 150 and 160 as described above, and displays an image based on the signal received from the image processor 530.

Figure 17:
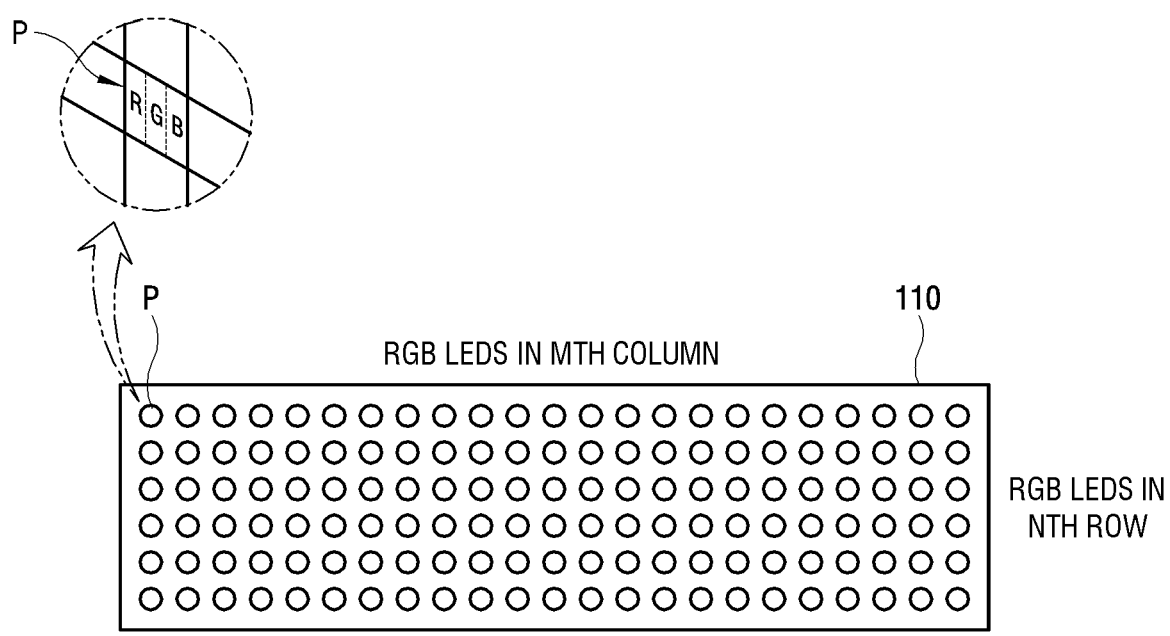
FIG. 17 is a diagram illustrating an example of a display module forming a display in a display apparatus according to various embodiments.

FIG. 17 is a diagram illustrating an example of the display module forming the display in the display apparatus according to various embodiments.

As shown in FIG. 17, each of the display modules 110, 120, 130, 140, 150 and 160, which form the display 100 in the display apparatus 1 according to an embodiment of the disclosure, may include, for example, a plurality of light emitting devices arranged in a matrix form.

For example, the plurality of light emitting devices (hereinafter, also referred to as inorganic light emitting devices) such as light emitting diodes (LED) may be mounted to the display modules 110, 120, 130, 140, 150 and 160.

As shown in FIG. 17, the plurality of light emitting devices are mounted to each of the display modules 110, 120, 130 and 140 as arranged in the matrix form of MXN, and configured to form a screen for displaying an image.

FIG. 17 shows an example that the plurality of light emitting devices are arranged in a certain display module 110 forming the display 100 in the display apparatus 1 according to an embodiment as shown in FIG. 4 or 15. Likewise, the other display modules 120, 130, 140, 150 and 160 may also include the plurality of light emitting devices arranged as shown in FIG. 17. However, there are no limits to the number and arranged pattern of light emitting devices mounted to each of the display modules 110, 120, 130, 140, 150 and 160.

The screen of the display 100 including the plurality of display modules 110, 120, 130, 140, 150 and 160 mounted with such light emitting devices is formed with a plurality of pixels (P). The plurality of light emitting devices are provided corresponding to the plurality of pixels P.

According to an embodiment, the plurality of pixels P may include at least one light emitting device of red (R), green (G) and blue (B) colors per pixel.

According to an embodiment, the plurality of pixels P may include light emitting devices respectively corresponding to red (R), green (G) and blue (B) colors for each pixel.

Each light emitting device is driven to emit light with various brightness levels and various colors in response to a control signal. An image displayed on the display 100 may be formed by combination of light emitted from the plurality of pixels P.

In the display apparatus 1 according to an embodiment of the disclosure, the display modules 110, 120, 130 and 140 based on the light emitting devices (LED) may be manufactured using a subminiature LEDs, e.g., micro LEDs in units of micrometers (μm).

Referring to FIG. 16, the display 100 includes the second driver 170 for driving the plurality of display modules 110, 120, 130 and 140.

According to an embodiment, the second driver 170 may be provided in plural to drive one or more display modules 110, 120, 130, 140, 150 and 160.

For example, four drivers may be provided to respectively drive the plurality of display modules 110, 120, 130 and 140 in the embodiment shown in FIG. 4, and six drivers may be provided to respectively drive the plurality of display modules 110, 120, 130, 140, 150 and 160 in the embodiment shown in FIG. 15.

In the embodiment of FIG. 4, for example, two drivers may be provided to drive the display modules in units of a preset number of display modules among the plurality of display modules 110, 120, 130 and 140, for example, two display modules such as the first and second display modules 110 and 120, and the third and fourth display modules 130 and 140.

As described above, the display 100 forming a screen with the plurality of display modules 110, 120, 130, 140, 150 and 160 may be driven to display an image based on predetermined content on a partial region or the entire region of the screen. Therefore, the region of the screen, on which an image is displayed, may be configured with at least one display module.

According to an embodiment, at least one display module forming the region where an image is displayed may be independently driven by the second driver 170 configured to drive the at least one display module. In other words, when an image is displayed on a partial region of the screen, not all the display modules of the display 100 but only some display modules corresponding to the region where the image is displayed are selectively driven among the plurality of display modules.

According to an embodiment, the second driver 170 may be provided as a timing controller, e.g., the T-con board that processes image data and generates a timing control signal in order to drive the corresponding display modules.

For example, the display 100 may include the T-con board corresponding to each of the display modules 110, 120, 130, 140, 150 and 160, and the plurality of drivers corresponding to the plurality of display modules 110, 120, 130, 140, 150 and 160 may be respectively mounted to the T-con boards. Here, the T-con board may for example be provided in the physical objects 111, 121, 131 and 141 coupled onto the backs of the display modules 110, 120, 130, 140, 150 and 160 as shown in FIG. 4.

The image processor 530 may output a signal to at least one second driver 170 provided in the display 100. Here, the output signal may further include identification information about at least one display module on which an image will be displayed, as region information about a screen region where the image will be displayed in the display 100.

According to an embodiment, the image processor 530 may output a signal, which includes the identification information about the screen region where the image will be displayed, to the second driver based on a usable screen region formed by the display modules being in the second state among the plurality of display modules 110, 120, 130, 140, 150 and 160.

The second driver 170 receives a signal from the image processor 530 and drives the corresponding display modules based on the information about the region, thereby displaying the image of the content on the display 100.

According to an embodiment, when the plurality of second drivers 170 are respectively provided on the backs of the display modules 110, 120, 130, 140, 150 and 160, the display modules to be respectively driven by the drivers may receive driving signals by a daisy chain scheme. An example of respectively transmitting the driving signals to the display modules 110, 120, 130, 140, 150 and 160 is the same as described with reference to FIG. 15.

The signal output from the image processor 530 may be transmitted to the second drivers respectively corresponding to the display modules 110, 120, 130, 140, 150 and 160 from the top toward the bottom, that is, in order from the first display module 110 toward the sixth display module 160, and this driving signal may be transmitted through the first signal line 431 based on the coupling between the first connectors 411 and 421 or through the second signal line 432 based on the coupling between the second connectors 412 and 422.

Therefore, the second driver 170 is configured to drive the display modules 110, 120, 130, 140, 150 and 160 in sequence based on the signal received from the image processor 530.

The power supply 540 supplies power to the elements of the display apparatus 1. For example, the power supply 540 may supply driving power (electric power) to the plurality of display modules 110, 120, 130, 140, 150 and 160 forming the display 100.

According to an embodiment, the display apparatus 1 may include a plurality of power supplies 540 to thereby supply power to the plurality of display modules 110, 120, 130, 140, 150 and 160 forming the display 100.

For example, the plurality of power supplies 540 may be provided corresponding to the plurality of display modules 110, 120, 130, 140, 150 and 160, respectively. In other words, the display apparatus 1 of the disclosure may be embodied to include the power board in which the power supplies 540 are provided corresponding to the display modules 110, 120, 130, 140, 150 and 160. The power board may, as shown in FIG. 4, be provided in the physical objects 111, 121, 131 and 141 mounted onto the backs of the display modules 110, 120, 130 and 140.

However, there are no limits to the number and arranged pattern of power supplies 540 according to the disclosure. For example, two or more display modules may be configured to receive power from one power supply. In this case, each power supply 540 may supply power even to the second driver 170 corresponding to one or more display modules 110, 120, 130, 140, 150 and 160 to which power will be supplied from the power supply 540.

The power supply 540 may be embodied by a switching mode power supply (SMPS), and receive alternating current (AC) power from a household or office wall.

When the display apparatus 1 includes the plurality of power supplies 540, each of them may operate as an independent power supply.

According to an embodiment, at least some among the plurality of power supplies 540 may for example be connected by a daisy chain scheme, thereby receiving AC power in sequence from the outside.

All of the plurality of power supplies 540 may be connected to receive power from a single AC power source, or some among the plurality of power supplies 540 may be connected to receive power from a plurality of AC power sources.

According to an embodiment, the power supply 540 converts AC power into direct current (DC) power, and supplies the DC power to the elements of the display apparatus 1. According to an alternative embodiment, one among the plurality of power supplies 540 may convert the AC power into the DC power, and transfer the DC power to another connected power supply.

Where the plurality of power supplies 540 are provided corresponding to the display modules 110, 120, 130, 140, 150 and 160, the display modules 110, 120, 130, 140, 150 and 160 may sequentially receive power. An example of supplying the power to the display modules 110, 120, 130, 140, 150 and 160 is the same as described with reference to FIG. 15.

The power may be supplied to the display modules 110, 120, 130, 140, 150 and 160 from the top toward the bottom, in other words, in order from the first display module 110 to the sixth display module 160. For example, the power may be supplied through the first signal line 431 based on the coupling between the first connectors 411 and 421 or through the second signal line 432 based on the coupling between the second connectors 412 and 422.

According to an embodiment, when the driving signal and the power are supplied to the display modules 110, 120, 130, 140, 150 and 160 in sequence as described with reference to FIG. 15, the controller 570 may control the driving signal and the power to be supplied to some among the plurality of display modules 110, 120, 130, 140, 150 and 160, for example, to the first, second, third and fourth display modules 110, 120, 130 and 140. In this case, as described with reference to FIG. 7, some among the display modules 110, 120, 130 and 140 may be controlled to form the screen of the display 100 for displaying an image thereon.

According to an embodiment, the power supply 540 of the display apparatus 1 may have a structure capable of wirelessly transmitting and receive power. For example, the power supply 540 may be embodied to wirelessly transmit and receive power based on magnetic induction or magnetic resonance in such a manner that a transmission coil TX Coil generates a magnetic field oscillating at a predetermined frequency and transfers energy (power) to a reception coil RX Coil.

According to an embodiment, circuitry such as the imaging board for the image processor 530, the T-con board for the second driver 170, and the power board for the power supply 540 may be provided in the physical objects 111, 121, 131 and 141 installed on the backs of the display modules 110, 120, 130 and 140.

According to an embodiment, the imaging board, the T-con board, the power board, etc. may be provided in such a form that at least some of them are separated in the ceiling on which the display apparatus 1 is stationarily installed, a separate appended device (e.g. a media box or an OC box), etc.

Referring back to FIG. 16, the user input receiver 550 may include various user input circuitry and transmits various preset control commands or unrestricted information to the controller 570 in response to a user input.

According to an embodiment, the user input receiver 550 includes an input device that generates a command/data/information/signal previously set to remotely control the display apparatus 1 and transmits it to the display apparatus 1.

The input device is provided to receive a user input as separated from the display apparatus 1 like a remote controller. The remote controller may include at least one of a touch sensor for receiving a user's touch input or a motion sensor for detecting its own motion caused by a user.

The input device includes a terminal such as a smartphone in which a remote-control application is installed. In this case, the input device can receive a user's touch input through the touch screen.

The input device may transmit a signal through wireless communication with the display apparatus 1, in which the wireless communication may be based on at least one of Bluetooth, IrDA, RF communication, WLAN, or Wi-Fi direct.

According to an embodiment, the user input receiver 550 may further include a voice input receiver that receives a voice/sound uttered by a user. The voice input receiver may be embodied by a microphone that receives a voice signal, and installed in the remote controller or the like.

According to an embodiment, the user input receiver 550 may receive a user input for controlling all or some of the plurality of display modules 110, 120, 130, 140, 150 and 160 to switch to the second state and display an image. For example, a user may use the remote controller to watch a broadcast through the display apparatus 1, and this control may be included in the input for controlling the display module to switch to the second state and display an image.

Further, the user input receiver 550 may receive a user input that selects at least one of the size, e.g., a resolution or the position of an image to be displayed, based on the usable screen region formed by the display modules being in the second state.

The storage 560 may be configured to store various pieces of data of the display apparatus 1. The storage 560 may be embodied by a nonvolatile memory (or a writable ROM) which can retain data even though the display apparatus 1 is powered off, and mirror changes. That is, the storage 250 may include at least one among a flash memory, an HDD, an EPROM or an EEPROM. The storage 560 may further include a volatile memory such as a DRAM or an SRAM, of which reading or writing speed for the display apparatus 1 is faster than that of the nonvolatile memory.

Data stored in the storage 560 may for example include not only an OS for driving the display apparatus 20 but also various software, programs, applications, image data, appended data, etc. executable on the OS.

The storage 560 may be configured to store graphic data autonomously provided by the display apparatus 1. The graphic data is output to the display 100 as a signal processed by the image processor 530, and may be displayed as graphics such as OSD, a GUI (hereinafter also referred to as a "UI"), etc. in a certain area on the screen. Here, the output signal may further include identification information about the display module for displaying graphics as region information about the region of the screen on which the graphics will be displayed.

The controller 570 may include various processing and/or controlling circuitry and performs control for operating general elements of the display apparatus 1. The controller 570 executes a control program (or an instruction) to perform such a control operation. The controller 570 may include at least one of general-purpose processors that load at least a part of a control program from a nonvolatile memory installed with the control program to a volatile memory and executes the loaded control program, and may for example be embodied by a CPU, an application processor (AP) or a microprocessor.

The processor may include a single-core processor, a dual-core processor, a triple-core processor, a quad-core processor, or the like multiple-core processor. The processor may include a plurality of processors, for example, a main processor and a sub processor that operates in a sleep mode (e.g. when the display apparatus is supplied with only standby power and does not serve to display an image). Further, the processor, the ROM, and the RAM are connected to one another through an internal bus, and the ROM and the RAM are included in the foregoing storage 560.

According to an embodiment, the processor embodied as an example of the controller 570 according to the disclosure may be embodied as included in the main SoC mounted to the PCB internally provided in the display apparatus 1. According to another embodiment, the main SoC may further include the image processor 530.

The control program may include a program(s) achieved by at least one of a BIOS, a device driver, an OS, a firmware, a platform, or an application program (or an application). According to an example embodiment, the application program may be previously installed or stored in the display apparatus 1 when the display apparatus 1 is manufactured, or may be installed in the display apparatus 1 based on application data received from the outside when it is required in the future. The application data may for example be downloaded from an external server such as an application market (e.g. the App store) to the display apparatus 1. Such an external server is merely an example of the computer program product according to the disclosure, but not limited thereto.

According to an embodiment, the operation of the controller 570 may be embodied by a computer program stored in the computer program product (not shown) provided separately from the display apparatus 1. In this case, the computer program product includes a memory in which an instruction corresponding to a computer program is stored, and a processor.

Therefore, the controller 570 of the display apparatus 20 may download and execute a computer program stored in a separate computer program product, and perform the foregoing operations.

According to an embodiment, the controller 570 may control the electromagnets of the coupling guides 310 and 320 to drive the coupling guides 310 and 320 forming a pair to be attached to each other when the plurality of display modules 110, 120, 130, 140, 150 and 160 switches over from the first state to the second state.

For example, the controller 570 detects switching between the first state and the second state of the display modules 110, 120, 130, 140, 150 and 160, and controls the electromagnets of the coupling guides 310 and 320 provided between the adjacent display modules forming a pair and being in the second state, thereby allowing the corresponding display modules to be attached to each other by the magnets of the coupling guides 310 and 320 in the second state.

According to an embodiment, the controller 570 may control the electromagnets to be driven so that the plurality of pairs of coupling guides 310 and 320 can be attached in sequence from the top toward the bottom as described with reference to FIGS. 11 and 13 when the display modules 110, 120, 130, 140, 150 and 160 switch from the first state to the second state. Further, the controller 570 may control the electromagnets to be driven so that the plurality of pairs of coupling guides 310 and 320 can be detached in sequence from the bottom toward the top as described with reference to FIGS. 12 and 14 when the display modules 110, 120, 130, 140, 150 and 160 switch from the second state to the first state.

According to an embodiment, the controller 570 may control the electromagnets to be driven so that the plurality of pairs of coupling guides 310 and 320 can be selectively attached or detached to make some among the plurality of display modules 110, 120, 130 and 140 be in the first state, and the rest be in the second state.

As described above, in the display apparatus 1 in which the plurality of display modules 110, 120, 130, 140, 150 and 160 are controllable to be selectively in the first state or the second state, the controller 570 may control the power supply 540 to supply the power to not the display modules being in the first state but the display modules being in the second state.

Further, the controller 570 may control the plurality of display modules 110, 120, 130, 140, 150 and 160 so that the display modules being in the first state cannot display an image but the display modules being in the second state can display an image.

The sensor 580 may be installed at a predetermined position of the display apparatus 1, and identify whether each of the plurality of display modules 110, 120, 130, 140, 150 and 160 is in the first state or the second state.

According to the disclosure, the sensor 580 may be embodied without limitations.

For example, the sensor 580 may be embodied by an optical sensor that includes a light emitter and a light receiver. In this case, the optical sensor may be installed in the display apparatus 1 so that light can be transmitted from the light emitter to the light receiver in the second state where the plurality of display modules 110, 120, 130, 140, 150 and 160 are unfolded.

For another example, the sensor 580 may be embodied by magnetic sensors that can identify whether the coupling guides 310 and 320 are attached by the magnets. In this case, the magnetic sensor detects magnetism generated by the attachment of the coupling guides 310 and 320, in other words, detects a magnetic signal, thereby identifying the first state or the second state of the corresponding display module. By detecting whether the coupling guides 310 and 320 forming a pair keep the attachment based on the attractive force of the magnets, it is possible to identify the display modules being in the second state.

The controller 570 may control the power supply 540 to supply power to the identified display modules being in the second state among the plurality of display modules 110, 120, 130, 140, 150 and 160 based on the foregoing identification result of the sensor 580.

Further, the controller 570 may identify the display modules being in the second state among the plurality of display modules 110, 120, 130, 140, 150 and 160 based on the identification result of the sensor 580, and control the image processor 530 and the second driver 170 to display an image by selectively driving the identified display module being in the second state.

According to an embodiment, the controller 570 may identify the first state or the second state of the corresponding display module, based on the connection between the first signal lines 431 or between the second signal lines 432 shown in FIG. 15.

For example, the controller 570 may detect whether the first signal lines 431 are connected by attachment between the first connectors 411 and 421 forming a pair or whether the second signal lines 432 are connected by attachment between the second connectors 412 and 422 forming a pair, based on a feedback on a signal given through the first signal line 431 or the second signal line 432.

The controller 570 may identify the display module being in the second state among the plurality of display modules 110, 120, 130, 140, 150 and 160 based on the feedback of the foregoing signal lines 431 and 432, and control the image processor 530 and the second driver 170 to display an image by selectively driving the identified display module being in the second state.

The controller 570 may identify the usable screen region capable of displaying an image, based on the foregoing identified display module being in the second state among the plurality of display modules 110, 120, 130, 140, 150 and 160.

According to an embodiment, the controller 570 may adjust at least one of the size, e.g., the resolution or the position of the image to be displayed on the display 100, based on the usable screen region of the display module being in the second state.

The controller 570 may automatically adjust at least one of the size or the position of the image based on the identified usable screen region, or may adjust at least one of the size or the position of the image to be displayed corresponding to a user input to the UI displayed for changing the size or position of the image.

Below, a method of controlling the display apparatus according to an embodiment of the disclosure will be described with reference to the accompanying drawings.

Figure 18:
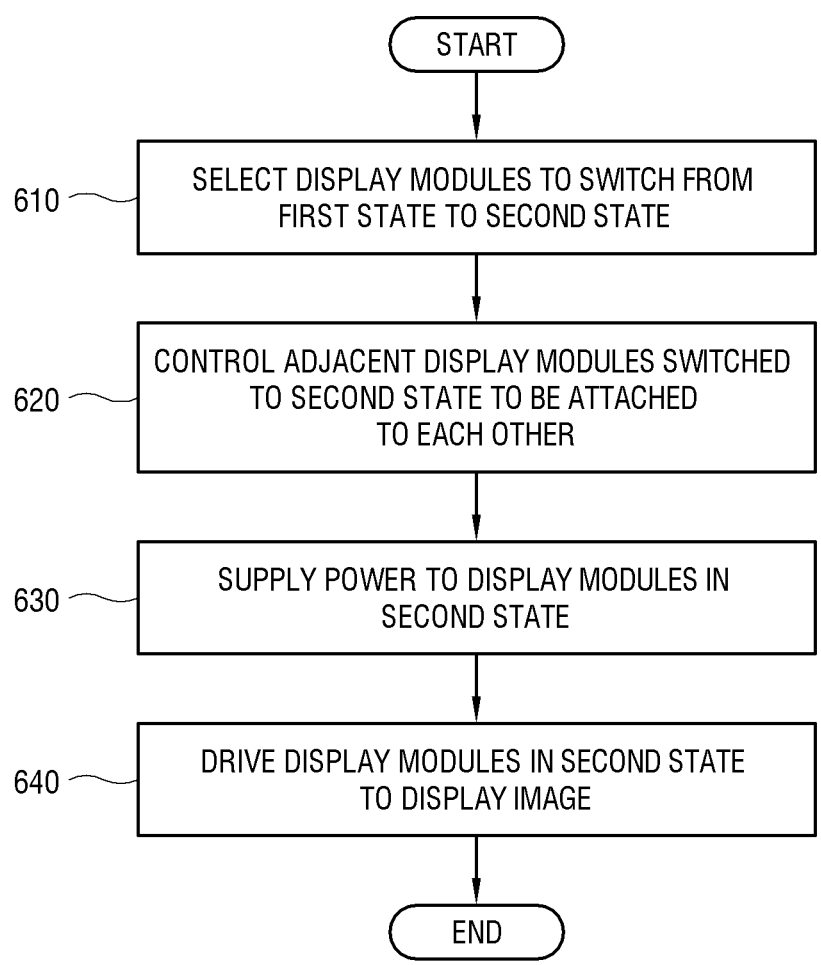
FIG. 18 is a flowchart illustrating an example method of controlling a display apparatus according to various embodiments.
Figure 19:
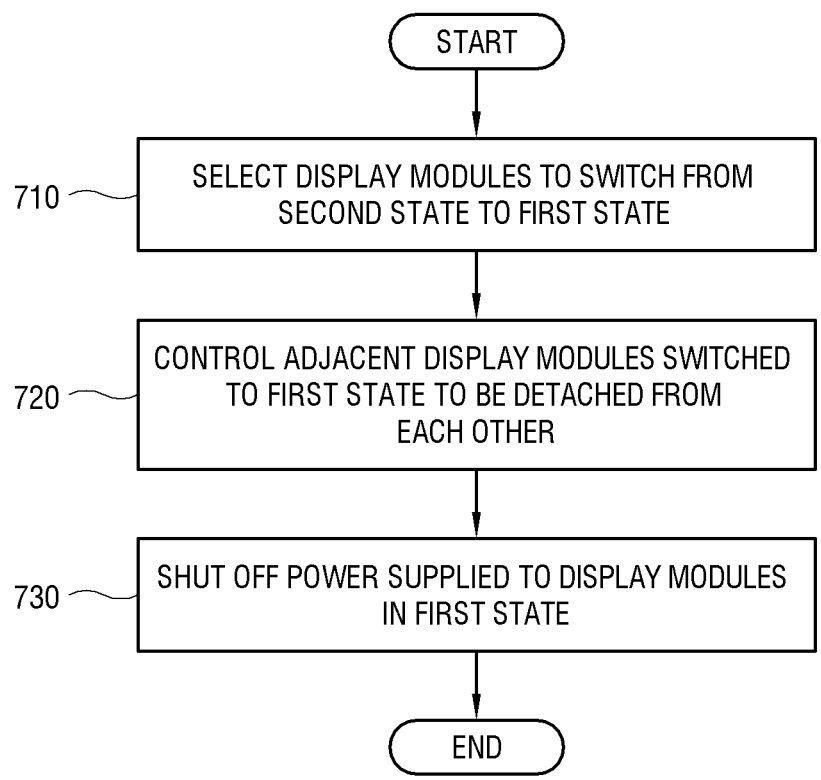
FIG. 19 is a flowchart illustrating an example method of controlling a display apparatus according to various embodiments.

FIGS. 18 and 19 are flowcharts illustrating example methods of controlling the display apparatus according various embodiments.

As described above, the display apparatus 1 with the display 100, of which the plurality of display modules 110, 120, 130, 140, 150 and 160 can switch between the folded-up state, e.g., the first state and the unfolded state, e.g., the second state, may receive selection for switching the display modules over from the first state to the second state as shown in FIG. 18 (610). The display modules switching to the second state may correspond to all or some of the plurality of display modules 110, 120, 130, 140, 150 and 160, and the selection may for example be received through the remote controller or the like user input receiver 550.

The controller 570 controls the adjacent display modules switched to the second state to be attached to each other, based on the selection in the operation 610 (620). The controller 570 controls the electromagnets provided at both or one of the coupling guides 310 and 320 provided between the adjacent display modules switched to the second state and forming a pair, so that the corresponding display modules forming a pair can be attached to each other. Such attached display modules forming a pair keeps the attached state without movement by the engagement between the protruding portion 311 and the recessed portion 321 of the coupling guides 310 and 320.

The controller 570 may control the power supply 540 to supply power to the display modules in the second state based on the coupling in the operation 620 (630). The display modules in the second state may receive power in sequence from the top toward the bottom.

Further, the controller 570 may control the driver 170 to drive the display modules in the second state to display an image based on the attachment in the operation 620 (640). A driving signal may be transmitted to the display modules being in the second state from the top toward the bottom.

As described above, the display apparatus 1 may receive selection for switching the display modules, which are switched to the second state in the operation 620 of FIG. 18, from the second state to the first state as shown in FIG. 19 (710). The display modules switching to the first state may correspond to all or some of the plurality of display modules 110, 120, 130, 140, 150 and 160, and the selection may for example be received through the remote controller or the like user input receiver 550.

The controller 570 controls the adjacent display modules switched to the first state to be detached from each other, based on the selection in the operation 710 (720). The controller 570 controls the electromagnets provided at both or one of the coupling guides 310 and 320 provided between the adjacent display modules forming a pair, so that the corresponding display modules forming a pair can be detached from each other and switch to the first state.

The controller 570 may control the power supply 540 to shut off the power supplied to the display modules in the first state based on the detachment in the operation 720 (730). The power supplied to the display modules being in the first state may be shut off in sequence from the bottom toward the top or may be simultaneously shut off with regard to all the display modules.

According to an example embodiment of the disclosure as described above, the foldable display with the plurality of display modules arranged in up and down directions naturally harmonizes with surroundings when folded and is convenient to form a screen when unfolded.

Further, according to an example embodiment of the disclosure, the display modules are unfolded and attached with the minimum and/or reduced seam therebetween and keep the attachment by the magnets, and the unfolded display modules are easily folded again by the repulsive force of the magnet, thereby having effects on providing convenience to a user in installation and use.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. A display apparatus comprising:
   a plurality of display modules each including a display arranged in up and down directions, and configured to switch between a first state, the first state being a folded state and a second state, the second state being an unfolded state;
   a plurality of joining units including a hinge provided between the plurality of display modules and configured to join adjacent display modules;
   a driver comprising a wire supporting the plurality of display modules, the driver configured to drive the plurality of display modules to switch to the first state or the second state by adjusting a length of the wire; and
   a pair of coupling guides provided on lateral sides of the plurality of display modules and configured to guide the adjacent display modules to switch between the first state and the second state.

2. The display apparatus according to claim 1, wherein the joining unit comprises a hinge configured to allow a pair of adjacent display modules to swing to each other.

3. The display apparatus according to claim 1, wherein the pair of coupling guides each comprise a magnet, are respectively provided on opposite lateral sides of the adjacent display modules forming a pair, and are coupled to each other by the magnets in the second state.

4. The display apparatus according to claim 3, wherein
   the magnet of at least one of the pair of coupling guides comprises an electromagnet, and
   the display apparatus further comprises a controller configured to control the electromagnet to be driven to attach the pair of coupling guides to each other when switching from the first state to the second state.

5. The display apparatus according to claim 4, wherein the controller is configured to control the electromagnets to be driven to attach a plurality of the pairs of coupling guides in sequence from a top toward a bottom when switching from the first state to the second state.

6. The display apparatus according to claim 4, wherein the controller is configured to control the electromagnet to be driven to detach the pair of coupling guides when switching from the second state to the first state.

7. The display apparatus according to claim 4, wherein, the controller is configured to control the electromagnets to be driven to selectively attach or detach a plurality of pairs of corresponding coupling guides.

8. The display apparatus according to claim 7, wherein the controller is configured to control the plurality of display modules to not display an image on display modules in the first state and to display an image on the display modules in the second state.

9. The display apparatus according to claim 8, wherein the controller is configured to control an image to be displayed to be adjusted in at least one of a size or a position based on a usable screen region formed by the display modules in the second state.

10. The display apparatus according to claim 4, further comprising a power supply,
wherein the controller is configured to control the power supply to supply no power to the display module in the first state, and to supply power to the display module in the second state.

11. The display apparatus according to claim 10, further comprising a sensor configured to identify whether each of the plurality of display modules is in the first state or the second state,
wherein the controller is configured to control the power supply to supply power to the identified display module in the second state among the plurality of display modules, based on an identification of the sensor.

12. The display apparatus according to claim 1, wherein the pair of coupling guides further respectively comprise a protruding portion, and a recessed portion accommodating the protruding portion in the second state.

13. The display apparatus according to claim 12, wherein the recessed portion has a shape corresponding to the protruding portion and is configured to fix the protruding portion to the recessed portion when accommodated in the recessed portion in the second state.

14. The display apparatus according to claim 1, further comprising a pair of first connectors respectively provided on opposite lateral sides of adjacent display modules, respectively provided with first signal lines providing power or an image signal, and configured to connect the first signal lines to each other in the second state and to disconnect the first signal lines in the first state.

15. The display apparatus according to claim 14, further comprising a pair of second connectors provided opposite the pair of first connectors with the pair of coupling guides therebetween, respectively provided with second signal lines connected to the first signal line, and configured to connect the second signal lines to each other in the second state and to disconnect the second signal lines in the first state.

16. The display apparatus according to claim 15, wherein the controller is configured to identify whether corresponding display modules are in the first state or the second state based on whether the first signal lines or the second signal lines are connected to each other.

17. The display apparatus according to claim 15, wherein the pair of first connectors or the pair of second connectors are attached to each other based on attachment between the pair of coupling guides, so that the first signal lines or the second signal lines can be connected to each other.

18. A method of controlling a display apparatus comprising: a plurality of display modules arranged in up and down directions, and configured to switch between a first state, the first state being a folded state and a second state, the second state being an unfolded state; a plurality of joining units including a hinge provided between the plurality of display modules and configured to join adjacent display modules; a driver comprising a wire supporting the plurality of display modules, the driver configured to drive the plurality of display modules to switch to the first state or the second state by adjusting a length of the wire; and a pair of coupling guides provided on lateral sides of the plurality of display modules and configured to guide the adjacent display modules to switch between the first state and the second state, the method comprising:
identifying that the display module switches from the first state to the second state; and
controlling a pair of adjacent display modules of the plurality of display modules in the second state to be coupled by driving an electromagnet included in the pair of coupling guides so that the pair of coupling guides can be attached when switching to the second state to couple.

19. The method according to claim 18, further comprising:
identifying whether each of the plurality of display modules is in the first state or the second state; and
controlling the display apparatus to supply no power to the display module in the first state among the plurality of display modules, and to supply power to the display module in the second state based on the identifying.

20. The method according to claim 19, further comprising controlling the display module in the first state among the plurality of display modules to not display an image, and controlling the display module in the second state to display an image.

* * * * *